United States Patent
Ono

(10) Patent No.: US 9,841,847 B2
(45) Date of Patent: Dec. 12, 2017

(54) PROJECTION DEVICE AND PROJECTION METHOD, FOR PROJECTING A FIRST IMAGE BASED ON A POSITION OF A MOVING OBJECT AND A SECOND IMAGE WITHOUT DEPENDING ON THE POSITION

(71) Applicant: Panasonic Intellectual Property Management Co., Ltd., Osaka (JP)

(72) Inventor: Keigo Ono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 14/966,219

(22) Filed: Dec. 11, 2015

(65) Prior Publication Data

US 2016/0188124 A1    Jun. 30, 2016

(30) Foreign Application Priority Data

Dec. 25, 2014  (JP) .................. 2014-263589
Nov. 30, 2015  (JP) .................. 2015-232658

(51) Int. Cl.
   *G06F 3/041*    (2006.01)
   *G06F 3/042*    (2006.01)
   *H04N 9/31*     (2006.01)

(52) U.S. Cl.
   CPC .......... *G06F 3/0425* (2013.01); *G06F 3/0416* (2013.01); *H04N 9/3114* (2013.01); *H04N 9/3158* (2013.01); *H04N 9/3179* (2013.01); *H04N 9/3194* (2013.01)

(58) Field of Classification Search
   CPC ..... G06F 3/0416; G06F 3/042–3/0428; G09G 3/001; H04N 9/31–9/3197
   See application file for complete search history.

(56) References Cited

U.S. PATENT DOCUMENTS

| | | |
|---|---|---|
| 6,512,507 B1 | 1/2003 | Furihata et al. |
| 6,690,357 B1 | 2/2004 | Dunton et al. |
| 2010/0074464 A1 | 3/2010 | Neufeld et al. |

(Continued)

FOREIGN PATENT DOCUMENTS

| | | |
|---|---|---|
| JP | 11-345086 | 12/1999 |
| JP | 2002-526867 | 8/2002 |

(Continued)

*Primary Examiner* — Laurence Sternbane
(74) *Attorney, Agent, or Firm* — Wenderoth, Lind & Ponack, L.L.P.

(57) ABSTRACT

A projection device according to the present disclosure includes a sensor unit (for example, a camera), a detection unit, a controller and a projection unit. The sensor unit detects an object. The detection unit detects a moving object (for example, a person), a first object, and a second object based on a signal output from the sensor unit. The controller generates a projection image such that a first image corresponding to the first object is projected on a first projection region and a second image corresponding to the second object is projected on a second projection region. In this case, the first image is determined based on a position of the moving object, and the second image is determined without depending on a position of the moving object. The projection unit projects the projection image.

7 Claims, 24 Drawing Sheets

(56) References Cited

U.S. PATENT DOCUMENTS

| | | | |
|---|---|---|---|
| 2011/0058109 A1* | 3/2011 | Nishigaki | G06F 3/0425 |
| | | | 348/744 |
| 2014/0218300 A1 | 8/2014 | Muraki et al. | |
| 2014/0285524 A1* | 9/2014 | Koyama | G06T 3/60 |
| | | | 345/650 |

FOREIGN PATENT DOCUMENTS

| | | | | |
|---|---|---|---|---|
| JP | 2006-252036 | 9/2006 | | |
| JP | 2011-124678 | 6/2011 | | |
| JP | 2013-44874 | 3/2013 | | |
| JP | 2013-235374 | 11/2013 | | |
| WO | 00/21024 | 4/2000 | | |
| WO | 2012/120958 | 9/2012 | | |
| WO | WO 2013099407 A1 * | 7/2013 | | G06F 3/0421 |

* cited by examiner

FIG. 7A

| Target object | Projection content | Projection region | Person following setting | | |
|---|---|---|---|---|---|
| | | | | Position | Direction |
| Table A | Content A | On target object | ON | YES | YES |
| Dish B | Content B | On target object | ON | NO | YES |
| Information board C | Content C | On target object | OFF | NO | NO |
| ... | ... | ... | ... | ... | ... |

FIG. 7B

| Target object | Characteristic amount |
|---|---|
| Table A | Characteristic amount A |
| Dish B | Characteristic amount B |
| Information board C | Characteristic amount C |
| ... | ... |

FIG. 7C

| Projection content | Data |
|---|---|
| Content A | Menu operation UI |
| Content B | Image of food |
| Content C | Image of food information |
| ... | ... |

| Target object | Projection content | Projection region |
|---|---|---|
| ... | Content A | Near person |
| Dish B | Content B | On target object |
| Information board C | Content C | On target object |
| ... | ... | ... |

FIG. 17A

| Target object | Projection content | Projection region |
|---|---|---|
| Dish B | Content B | On target object |
| Information board C | Content C | On target object |
| ... | ... | ... |

| Target object | Person following setting | | |
|---|---|---|---|
| | | Position | Direction |
| Parallel to reference plane | ON | NO | YES |
| Not parallel to reference plane | OFF | NO | NO |

| Target object | Projection content | Projection region |
|---|---|---|
| Table A | Content A | On target object |
| Dish B | Content B | On target object |
| Information board C | Content C | On target object |
| ... | ... | ... |

| Target object | Person following setting | | |
|---|---|---|---|
| | | Position | Direction |
| Region with no difference | ON | YES | YES |
| Region with difference | OFF | NO | NO |

721a / 721b / 721ba / 721bb / 721bc / 721

PROJECTION DEVICE AND PROJECTION METHOD, FOR PROJECTING A FIRST IMAGE BASED ON A POSITION OF A MOVING OBJECT AND A SECOND IMAGE WITHOUT DEPENDING ON THE POSITION

BACKGROUND

1. Technical Field

The present disclosure relates to a projection device and a projection method.

2. Description of the Related Art

Unexamined Japanese Patent Publication No. 2006-252036 describes a device of projecting an image onto an object. When an operator moves the object, the device projects an image onto this object at the position after the movement.

International Publication No. 2012/120958 describes a device that detects a target person, and variably controls a position where an image is projected according to the position of the target person.

SUMMARY

A projection device according to the present disclosure includes a sensor unit that detects an object; a detection unit configured to detect a moving object, a first object, and a second object based on a signal output from the sensor unit; a controller configured to generate a projection image such that a first image corresponding to the first object is projected on a first projection region and a second image corresponding to the second object is projected on a second projection region; and a projection unit projecting the projection image, wherein the controller determines the first image based on a position of the moving object, and determines the second image without depending on a position of the moving object.

BRIEF DESCRIPTION OF THE DRAWINGS

FIG. 7A is a diagram illustrating a detail of an image setting reference table according to the first exemplary embodiment;

FIG. 7B is a diagram illustrating a detail of a target object shape database;

FIG. 7C is a diagram illustrating a detail of a projection content database;

FIG. 17A is a diagram illustrating a detail of an image setting reference table according to the third exemplary embodiment;

FIG. 17B is a diagram illustrating a detail of a person following setting reference table;

FIG. 22A is a diagram illustrating a detail of an image setting reference table according to the fourth exemplary embodiment;

FIG. 22B is a diagram illustrating a detail of a person following setting reference table;

DETAILED DESCRIPTION

Exemplary embodiments will be described in detail below with reference to the drawings as necessary. However, more than necessary detailed descriptions will sometimes be omitted. For example, detailed descriptions for matters which have already been well known in the art and redundant descriptions for substantially the same configurations will sometimes be omitted. This is to prevent the description below from becoming unnecessarily redundant to facilitate understanding of a person skilled in the art.

Note that the accompanying drawings and the following description are provided by the applicant in order for a person of ordinary skill in the art to sufficiently understand the present disclosure, and they are not intended to limit the subject matter set forth in the claims.

First Exemplary Embodiment

A first exemplary embodiment will be described below with reference to FIGS. 1 to 11. In the description below, projector device 100 will be described as a specific exemplary embodiment of a projection device according to the present disclosure.

[1-1. Brief Summary]

Figure 1:
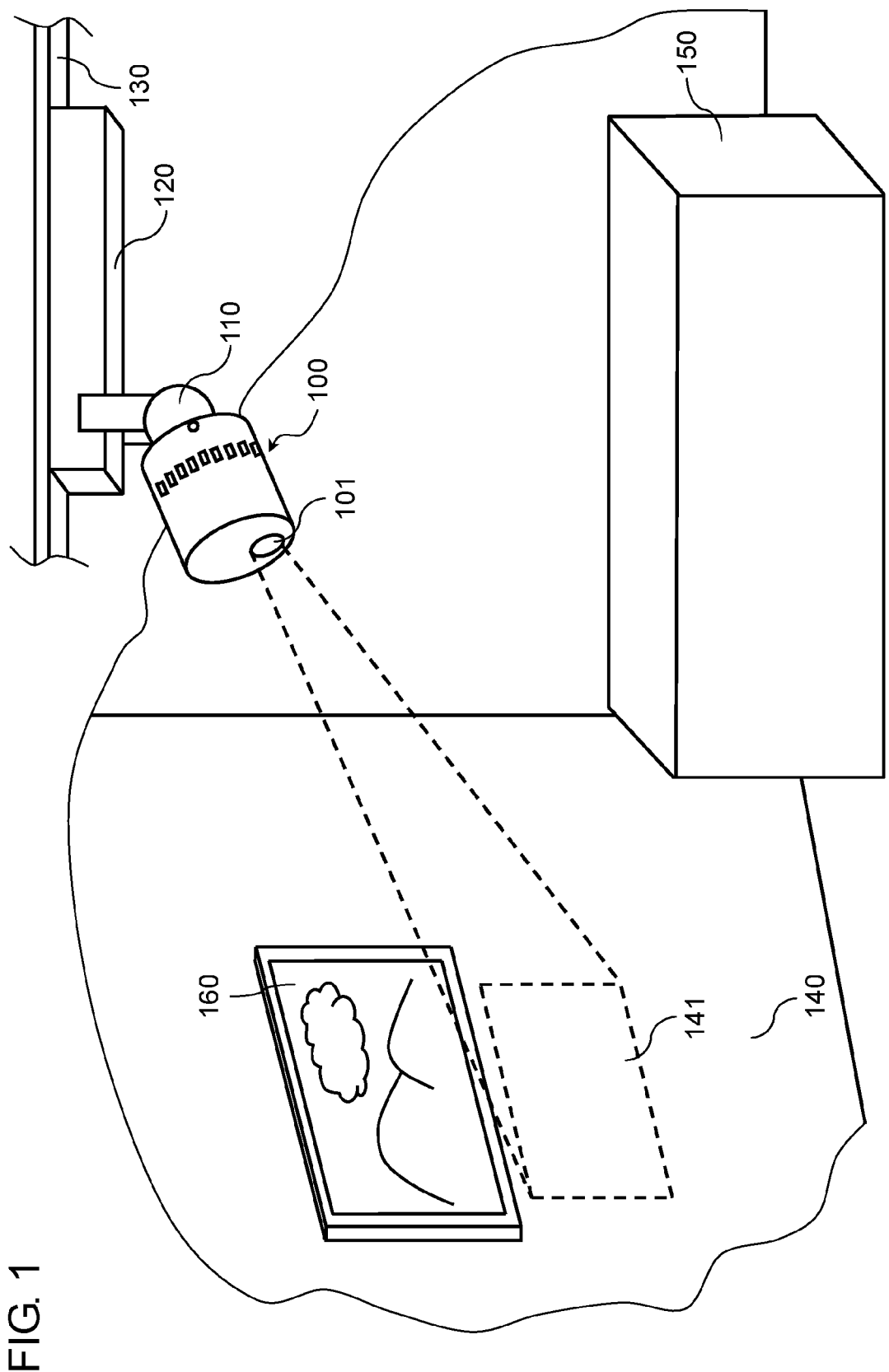
FIG. 1 is a schematic diagram illustrating a state in which a projector device projects an image onto a wall surface on which a picture is hung.
Figure 2:
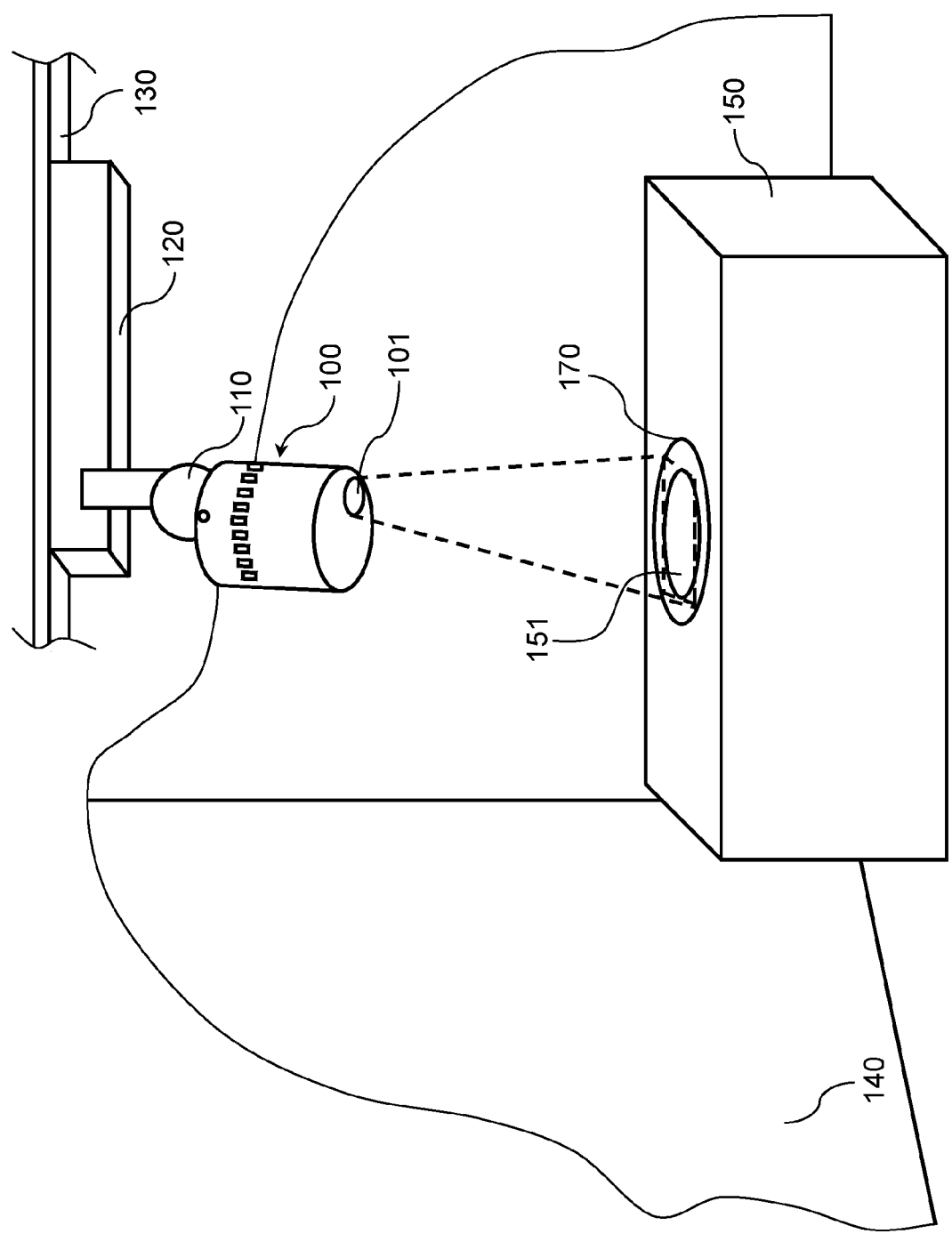
FIG. 2 is a schematic diagram illustrating a state in which a projector device projects an image onto a table on which a dish is placed.

A brief image projection operation with projector device 100 will be described with reference to FIGS. 1 and 2. FIG. 1 is a conceptual diagram illustrating that projector device 100 projects an image onto wall 140. FIG. 2 is a conceptual diagram illustrating that projector device 100 projects an image onto table 150.

As illustrated in FIGS. 1 and 2, projector device 100 is fixed to housing 120 with drive unit 110. Wiring lines electrically connected to projector device 100 and respective units composing drive unit 110 are connected to a power source via housing 120 and wiring duct 130. With this, electric power is supplied to projector device 100 and drive unit 110. Projector device 100 has opening 101. Projector device 100 projects an image through opening 101.

Drive unit 110 can drive projector device 100 to change a projection direction of projector device 100. As illustrated in FIG. 1, drive unit 110 can drive projector device 100 such that the projection direction of projector device 100 matches a direction toward wall 140. Thus, projector device 100 can project image 141 on wall 140 on which picture 160 is hung. Similarly, as illustrated in FIG. 2, drive unit 110 can drive projector device 100 such that the projection direction of projector device 100 matches a direction toward table 150. Thus, projector device 100 can project image 151 on dish 170 on table 150. Drive unit 110 may drive projector device 100 based on a user's manual operation or automatically drive projector device 100 according to a detection result of a predetermined sensor. Image 141 which is to be projected on wall 140 and image 151 which is to be projected on table 150 may be different from each other or the same as each other.

Projector device 100 includes object detection unit 200. With this, projector device 100 can detect a presence of an object (including a person and an object). Projector device 100 appropriately controls a position where a projection content is to be projected and/or a direction of a projection content when it is projected, based on a position and the like of a detected person or object.

[1-2. Configuration]

The configuration and operation of projector device 100 will be described in detail below.

Figure 3:
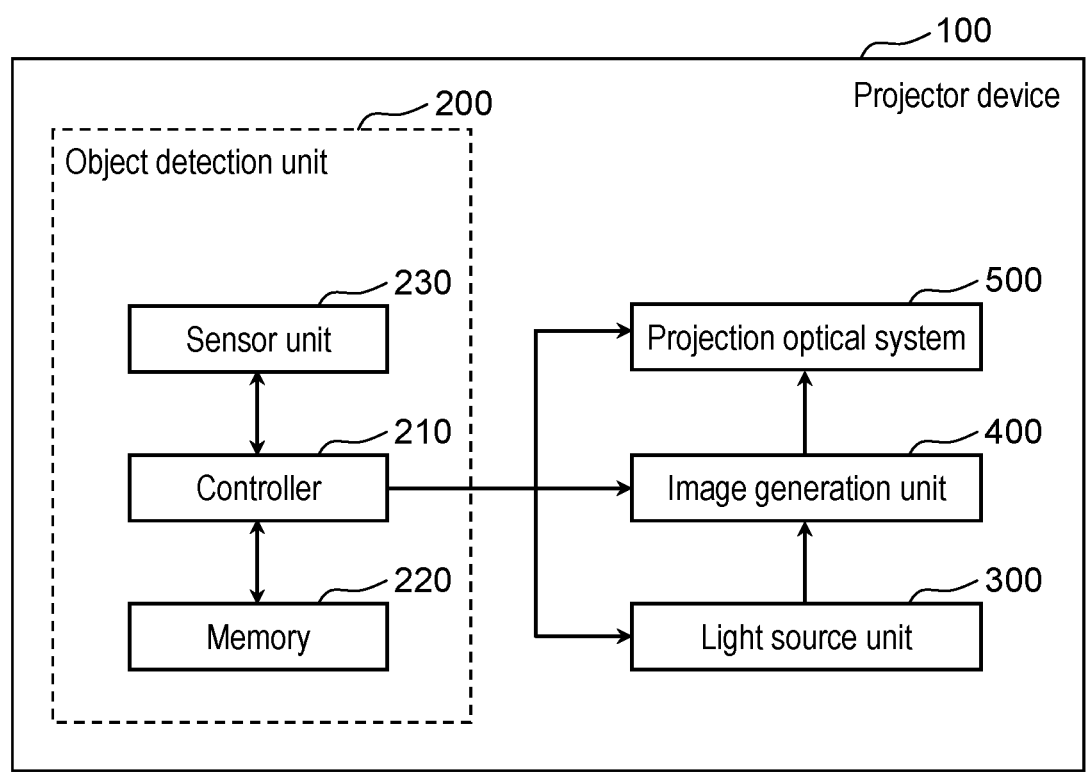
FIG. 3 is a block diagram illustrating an electrical configuration of the projector device.

FIG. 3 is a block diagram illustrating an electrical configuration of projector device 100. Projector device 100 includes object detection unit 200, light source unit 300, image generation unit 400, and projection optical system 500. The configuration of each unit composing projector device 100 will sequentially be described below.

Object detection unit 200 includes controller 210, memory 220, and sensor unit 230.

Controller 210 is a semiconductor element that generally controls projector device 100. Specifically, controller 210 controls the operations of the units (sensor unit 230, memory 220) composing object detection unit 200, and the operations of light source unit 300, image generation unit 400, and projection optical system 500. Controller 210 can also perform a digital zoom control for zooming in or zooming out a projection image with a video signal process, or perform a geometric correction to the projection image in consideration of a direction of a projection plane. Controller 210 may be implemented only with hardware, or with a combination of hardware and software.

Memory 220 is a memory element storing various information pieces. Memory 220 includes a flash memory or a ferroelectric memory. Memory 220 stores a control program and the like for controlling projector device 100. Memory 220 also stores various information pieces supplied from controller 210. Memory 220 also stores a reference table including settings as to image data (still image, moving image) of an image to be projected, a position where an image is to be projected, and a projection size, and a setting as to whether a projection position and/or direction of an image is to be changed or not by following a person which is a moving object. Memory 220 also stores data of a shape of a target object with the object detection.

Sensor unit 230 includes a distance image sensor of a TOF (Time-of-Flight) system (hereinafter referred to as a "TOF sensor"), for example. This sensor linearly detects a distance to a projection plane or an object which is opposite thereto. When facing wall 140, sensor unit 230 detects a distance from sensor unit 230 to wall 140. If picture 160 is hung on wall 140, sensor unit 230 can also detect the distance to the opposed front surface of picture 160. Similarly, when facing table 150, sensor unit 230 detects a distance from sensor unit 230 to table 150. If dish 170 is placed on table 150, sensor unit 230 can also detect the distance to the opposed front surface of dish 170.

Figure 4A:
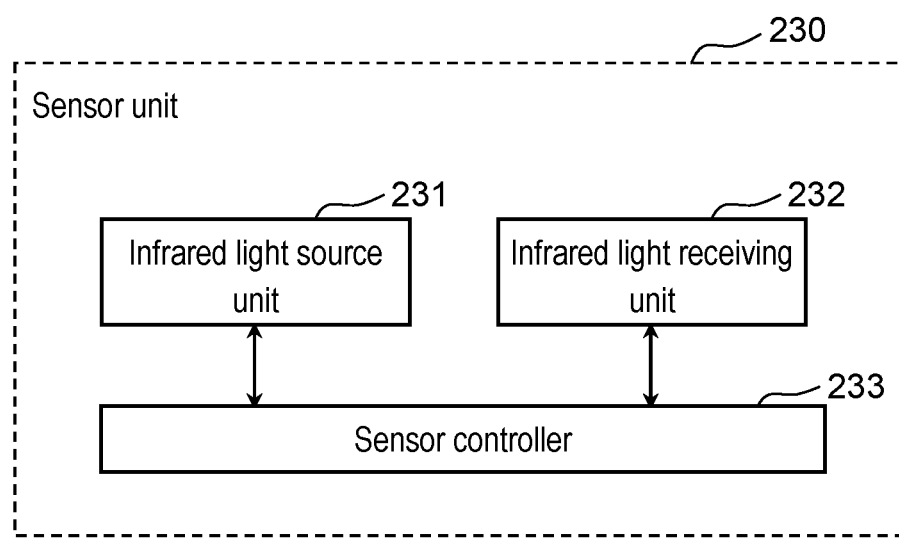
FIG. 4A is a block diagram illustrating an electrical configuration of a sensor unit.

FIG. 4A is a block diagram illustrating an electrical configuration of sensor unit 230. As illustrated in FIG. 4A, sensor unit 230 includes infrared light source unit 231 that emits infrared detection light, infrared light receiving unit 232 that receives infrared detection light reflected on an opposed plane of table 150 or dish 170, and sensor controller 233 that controls infrared light source unit 231 and infrared light receiving unit 232. Infrared light source unit 231 emits infrared detection light through opening 101 such that the infrared detection light is diffused completely around projector device 100. For example, infrared light source unit 231 uses infrared light with a wavelength of 850 nm to 950 nm as the infrared detection light. Sensor controller 233 stores the phase of the infrared detection light emitted from infrared light source unit 231 in a memory. When the opposed plane is not equidistant from sensor unit 230, and has a tilt or a shape, each of a plurality of pixels arrayed on the imaging plane of infrared light receiving unit 232 receives reflection light at different timings. Since each of the plurality of pixels receives reflection light at different timings, the infrared detection light received by infrared light receiving unit 232 has a different phase in each pixel. Sensor controller 233 stores the phase of the infrared detection light received by each pixel in infrared light receiving unit 232 in the memory.

Sensor controller 233 reads the phase of the infrared detection light emitted from infrared light source unit 231 and the phase of the infrared detection light received by each pixel in infrared light receiving unit 232 from the memory. Sensor controller 233 can measure the distance to the opposed plane from sensor unit 230 based on the phase difference between the infrared detection light emitted from infrared light source unit 231 and the infrared detection light received by infrared light receiving unit 232.

Figure 4B:
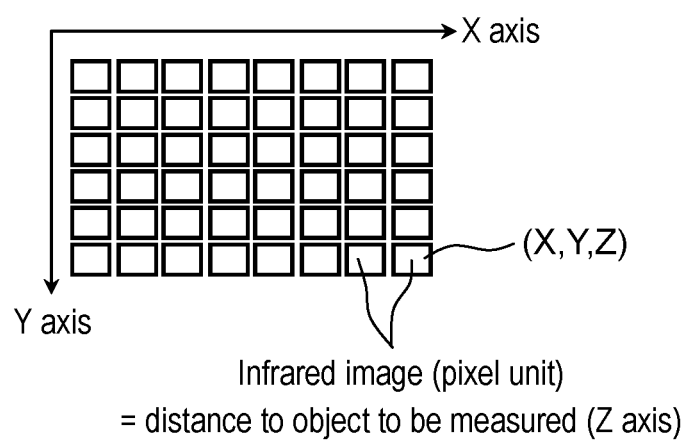
FIG. 4B is a diagram for describing distance information acquired by the sensor unit.

FIG. 4B is a diagram for describing distance information acquired by infrared light receiving unit 232 in sensor unit 230. Sensor unit 230 detects a distance to an object reflecting the infrared detection light based on the above phase difference for each of the pixels forming an infrared image with the received infrared detection light. With this, controller 210 can acquire the detection result about the distance for the entire region of the angle of view of the infrared image received by sensor unit 230 on a pixel basis. As illustrated in FIG. 4B, an X axis is specified in the horizontal direction of an infrared image, and a Y axis is specified in the vertical direction. A detected distance is defined as a value on a Z axis. With this, controller 210 can acquire coordinates (X, Y, Z) of three axes X, Y, and Z for each pixel forming the infrared image based on the detection result of sensor unit 230. Specifically, controller 210 can acquire distance information based on the detection result of sensor unit 230. Controller 210 can calculate a coordinate value (x, y, z) (with any origin) of an object surface in a triaxial orthogonal coordinate system from the distance information (X, Y, Z).

Controller 210 detects a projection plane (wall 140, top of table 150, etc.) and a specific object (picture 160, dish 170) based on the distance information (X, Y, Z) or the coordinate value (x, y, z).

A TOF sensor is illustrated above as an example of sensor unit 230. However, the present disclosure is not limited thereto. Specifically, distance detection unit 230 may be one that illuminates a known pattern such as a random dot pattern, and calculates distance based on deviation of the pattern, or may be one that utilizes disparity of a stereo camera. In addition, projector device 100 may have a RGB camera, not illustrated, as sensor unit 230. In such case, projector device 100 may detect an object by using image information output from the RGB camera. With use of the RGB camera, an object can be detected by using information such as a color of the object or characters written on the object.

Figure 5:
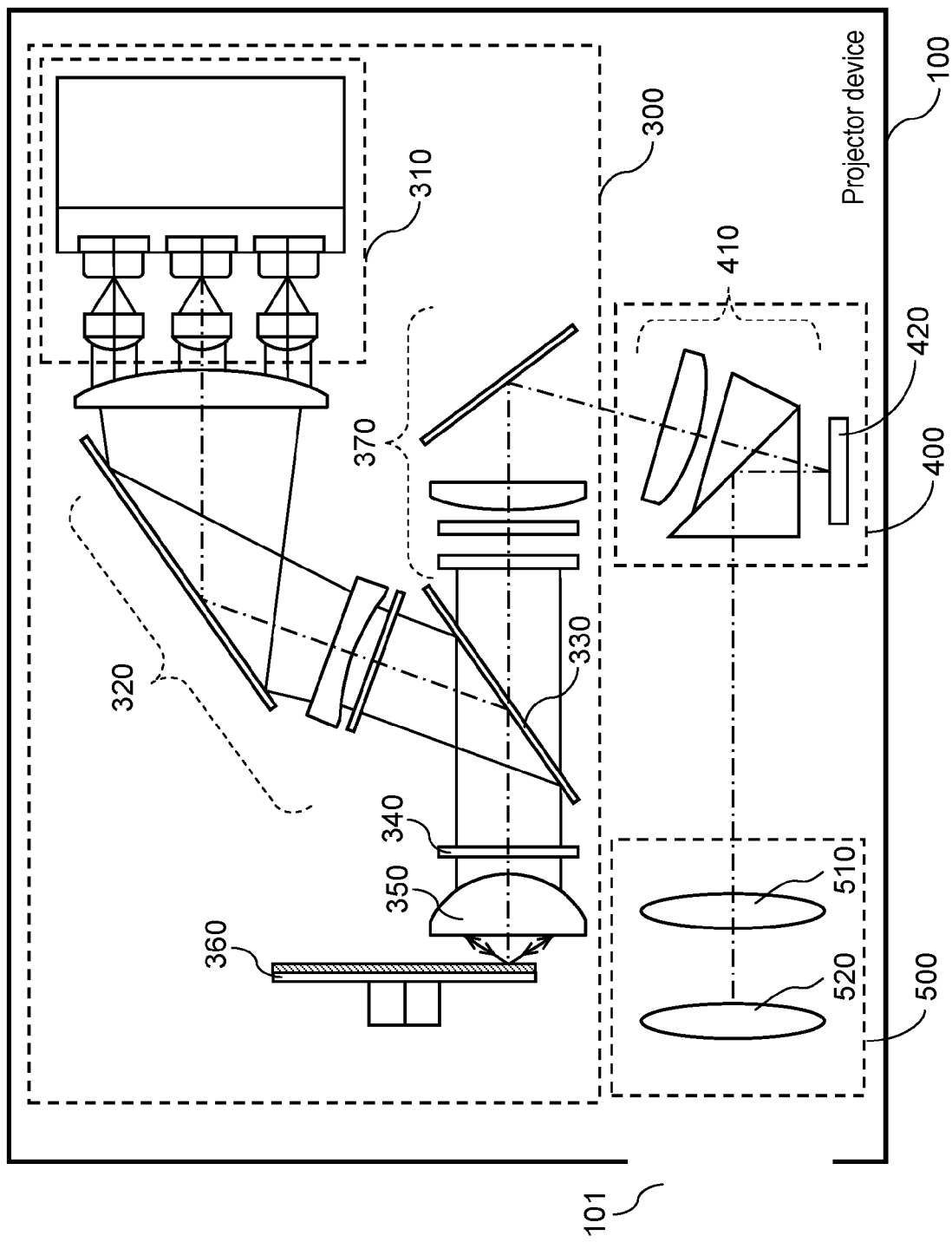
FIG. 5 is a block diagram illustrating an optical configuration of the projector device.

Next, the configurations of light source unit 300, image generation unit 400, and projection optical system 500 will be described with reference to FIG. 5. FIG. 5 is a block diagram illustrating the optical configuration of projector device 100. As illustrated in FIG. 5, light source unit 300 supplies light necessary for generating a projection image to image generation unit 400. Image generation unit 400 supplies the generated image to projection optical system 500. Projection optical system 500 performs optical conversion, such as focusing or zooming, to the image supplied from image generation unit 400. Projection optical system 500 faces opening 101, and projects an image through opening 101.

The configuration of light source unit 300 will firstly be described. As illustrated in FIG. 5, light source unit 300 includes semiconductor laser 310, dichroic mirror 330, λ/4 plate 340, phosphor wheel 360, and the like.

Semiconductor laser 310 is a solid light source that emits S polarized blue light with wavelength of 440 nm to 455 nm, for example. The S polarized blue light emitted from semiconductor laser 310 is incident on dichroic mirror 330 through light guide optical system 320.

For example, dichroic mirror 330 is an optical element having high reflectivity equal to or higher than 98% to the S polarized blue light with wavelength of 440 nm to 455 nm, and having high transmittance equal to or higher than 95% to P polarized blue light with wavelength of 440 nm to 455 nm and green light to red light with wavelength of 490 nm to 700 nm regardless of the polarization state. Dichroic mirror 330 reflects S polarized blue light emitted from semiconductor laser 310 toward λ/4 plate 340.

λ/4 plate 340 is a polarization element that converts linearly polarized light into circularly polarized light, or converts circularly polarized light into linearly polarized light. λ/4 plate 340 is disposed between dichroic mirror and phosphor wheel. The S polarized blue light incident on λ/4 plate 340 is converted into circularly polarized blue light, and then, emitted to phosphor wheel 360 through lens 350.

Phosphor wheel 360 is an aluminum flat plate configured to be rotatable with high speed. A plurality of B regions which is a region of a diffusion reflection surface, a plurality of G regions on which a phosphor emitting green light is applied, and a plurality of R regions on which a phosphor emitting red light is applied are formed on the surface of phosphor wheel 360. Circularly polarized blue light emitted to B region of phosphor wheel 360 is diffused and reflected to be again incident on λ/4 plate 340 as circularly polarized blue light. The circularly polarized blue light incident on λ/4 plate 340 is converted into P polarized blue light, and then, enters again dichroic mirror 330. In this case, the blue light entering dichroic mirror 330 is P polarized light. Therefore, this blue light passes through dichroic mirror 330, and enters image generation unit 400 through light guide optical system 370.

Blue light emitted to G region or R region of phosphor wheel 360 excites the phosphor applied on G region or R region to emit green light or red light. The green light or red light emitted from G region or R region is incident on dichroic mirror 330. In this case, the green light or red light entering dichroic mirror 330 passes through dichroic mirror 330, and enters image generation unit 400 through light guide optical system 370.

Since phosphor wheel 360 rotates with high speed, blue light, green light, and red light are emitted from light source unit 300 to image generation unit 400 in a time-shared manner.

Image generation unit 400 generates a projection image according to the video signal supplied from controller 210. Image generation unit 400 includes DMD (Digital-Mirror-Device) 420, and the like. DMD 420 is a display element having multiple micromirrors arrayed on a flat plane. DMD 420 deflects each of the arrayed micromirrors to spatially modulate the incident light according to the video signal supplied from controller 210. Light source unit 300 emits blue light, green light, and red light in a time-shared manner. DMD 420 sequentially and repeatedly receives blue light, green light, and red light, which are emitted through light guide optical system 410 in a time-shared manner. DMD 420 deflects each of the micromirrors in synchronization with the timing at which light of each color is emitted. Thus, image generation unit 400 generates a projection image according to the video signal. According to the video signal, DMD 420 deflects each of the micromirrors for light that directs to projection optical system and light that directs to a region outside an effective range of projection optical system. With this, image generation unit 400 can supply the generated projection image to projection optical system 500.

Projection optical system 500 includes optical components such as zoom lens 510 and focusing lens 520. The projection optical system enlarges the light advancing from image generation unit 400, and projects this light onto the projection plane. Controller 210 adjusts the position of zoom lens 510, thereby being capable of controlling a projection region of an object to be projected to have a desired zoom value. To increase the zoom value, controller 210 moves zoom lens 510 to the direction in which the angle of view becomes narrow to reduce the projection region. On the other hand, to decrease the zoom value, controller 210 moves zoom lens 510 to the direction in which the angle of view becomes wide to increase the projection region. Controller 210 also adjusts the position of focusing lens 520 to follow the movement of zoom lens 510 based on predetermined zoom tracking data, thereby being capable of adjusting focus of the projection image.

The configuration of DLP (Digital-Light-Processing) system using DMD 420 has been described above as one example of projector device 100. However, the present disclosure is not limited thereto. Specifically, a configuration with a liquid crystal system may be used for projector device 100.

The configuration of a single light source type in which the light source using phosphor wheel 360 is time-shared has been described above as one example of projector device 100. However, the present disclosure is not limited thereto. Specifically, a configuration using three light sources for blue light, green light, and red light may be used for projector device 100.

The configuration in which the light source for blue light for generating a projection image and the light source for infrared light for measuring a distance are different units has been described above. However, the present disclosure is not limited thereto. Specifically, the light source for blue light for generating a projection image and the light source for infrared light for measuring a distance may be combined into one unit. If a configuration using three light sources is used, the light source for each color and the light source for infrared light may be combined into one unit.

Next, data stored in memory 220 in object detection unit 200 will be described with reference to FIGS. 6 and 7.

Figure 6:
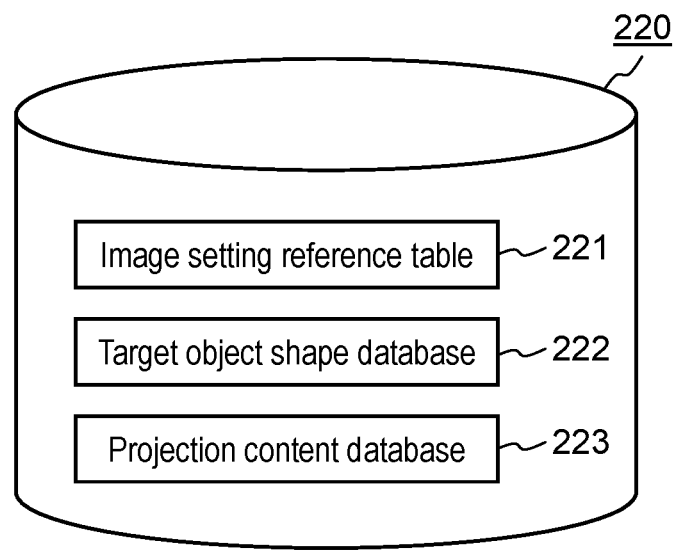
FIG. 6 is a schematic diagram for describing data stored in a memory according to a first exemplary embodiment.

FIG. 6 is a schematic diagram illustrating three types of data stored in memory 220. Memory 220 stores image setting reference table 221, target object shape database 222, and projection content database 223.

Image setting reference table 221 is a reference table indicating a region where an image is to be projected, and setting information as to whether a position where an image is to be projected and a direction of the image has to be changed or not by following a position of a detected moving object (e.g., a person) while associated with a specific target object.

FIG. 7A is a diagram illustrating the detail of image setting reference table 221. Image setting reference table 221 manages target object 221a, projection content 221b, projection region 221c of an image, and person following setting 221d in association with one another. Person following setting 221d includes information pieces of on/off setting flag 221da, position flag 221db, and direction flag 221dc.

Target object 221a is information indicating a target object which should be detected with the object detection. In FIG. 7A, "table A", "dish B", "information board C", and the like are managed as the information indicating a target object.

Projection content 221b is information relating to an image which should be projected when a target object is detected. This information includes a link with image data stored in projection content database 223. In FIG. 7A, contents A, B, and C are managed as the information indicating a projection content.

Projection region 221c is information relating to a region where an image should be projected when a target object is detected. In FIG. 7A, "on target object" is specified as information indicating a region where an image should be projected. This specifies such that, when "table A" is detected, "content A" which is a projection content should be projected on "table A", for example. The same is applied to the other target objects.

Person following setting 221d is information specifying whether a position where projection content 221b is projected and/or a direction has to be changed or not within projection region 221c according to a position of a person who is detected.

On/off setting flag 221da in person following setting 221d is a flag for specifying whether a position where a projection content is to be projected and/or a direction has to be changed or not according to a position of a detected person. On/off setting flag 221da is set to be "ON" when the projection position and/or projection direction has to be changed according to a position of a detected person, while it is set to be "OFF" when the projection position and/or projection direction should not be changed.

Position setting flag 221db in person following setting 221d is a flag for specifying whether a position where a projection content is to be projected has to be changed or not within projection region 221c according to a position of a detected person. Position flag 221db is set to be "YES" when a position where a projection content is to be projected has to be changed within projection region 221c according to a position of a detected person, while it is set to be "NO" when the position should not be changed.

Direction flag 221dc in person following setting 221d is a flag for specifying whether a direction of a projection content has to be changed or not according to a position of a detected person. Direction flag 221dc is set to be "YES" when a direction of a projection content has to be changed according to a position of a detected person, while it is set to be "NO" when the direction should not be changed.

For example, when detecting table 150 which is "table A" that is a target object by object detection unit 200, for example, projector device 100 projects content A on table 150 which is a projection region. In this case, when projector device 100 also detects a person, projector device 100 changes a projection position and direction of content A within the top of table 150, which is a projection region, according to the position of the person with person following setting 221d.

When detecting "dish B" which is a target object, projector device 100 projects content B on dish B which is a projection region, for example. In this case, when detecting a person, projector device 100 changes the direction of content B according to the position of the person with person following setting 221d.

On the other hand, as for target object "information board C" for which on/off setting flag 221da in person following setting 221d is set to be "OFF", when projector device 100 detects "information board C" which is a target object by object detection unit 200, projector device 100 displays content C on information board C which is a projection region. In this case, even when projector device 100 also detects a person, projector device 100 keeps on projecting content C on a predetermined position of information board C without depending on the position of the person.

As described above, projector device 100 according to the first exemplary embodiment stores, for each object to be detected, information specifying a region where a projection content should be projected and information specifying whether a position and/or direction of the projection content should be changed or not within the region according to a position of a detected person, and determines the position where the projection content should be projected and/or direction of the projection content by appropriately referring to these information pieces. With this configuration, as for a projection content whose projection position and/or direction is desirably changed according to a position of a moving object (e.g., person), projector device 100 can project the projection content by determining the position and/or direction according to the position of the person. On the other hand, as for a projection content which is desirably projected on a predetermined object on which the projection content is to be projected without depending on a position of a moving object (e.g., person), projector device 100 can determine a position where the projection content should be projected, and the like without depending on the position of the person, and project the projection content.

FIG. 7B is a diagram illustrating the detail of target object shape database 222. Target object shape database 222 is a database storing data indicating a characteristic amount of a shape for each target object.

FIG. 7C is a diagram illustrating the detail of projection content database 223. Projection content database 223 is a database storing data (still image or moving image) of each of projection contents and information indicating a summary of each of projection contents.

[1-3. Operation]

Next, an operation of projector device 100 will be described with reference to FIGS. 8 to 11.

Figure 8:
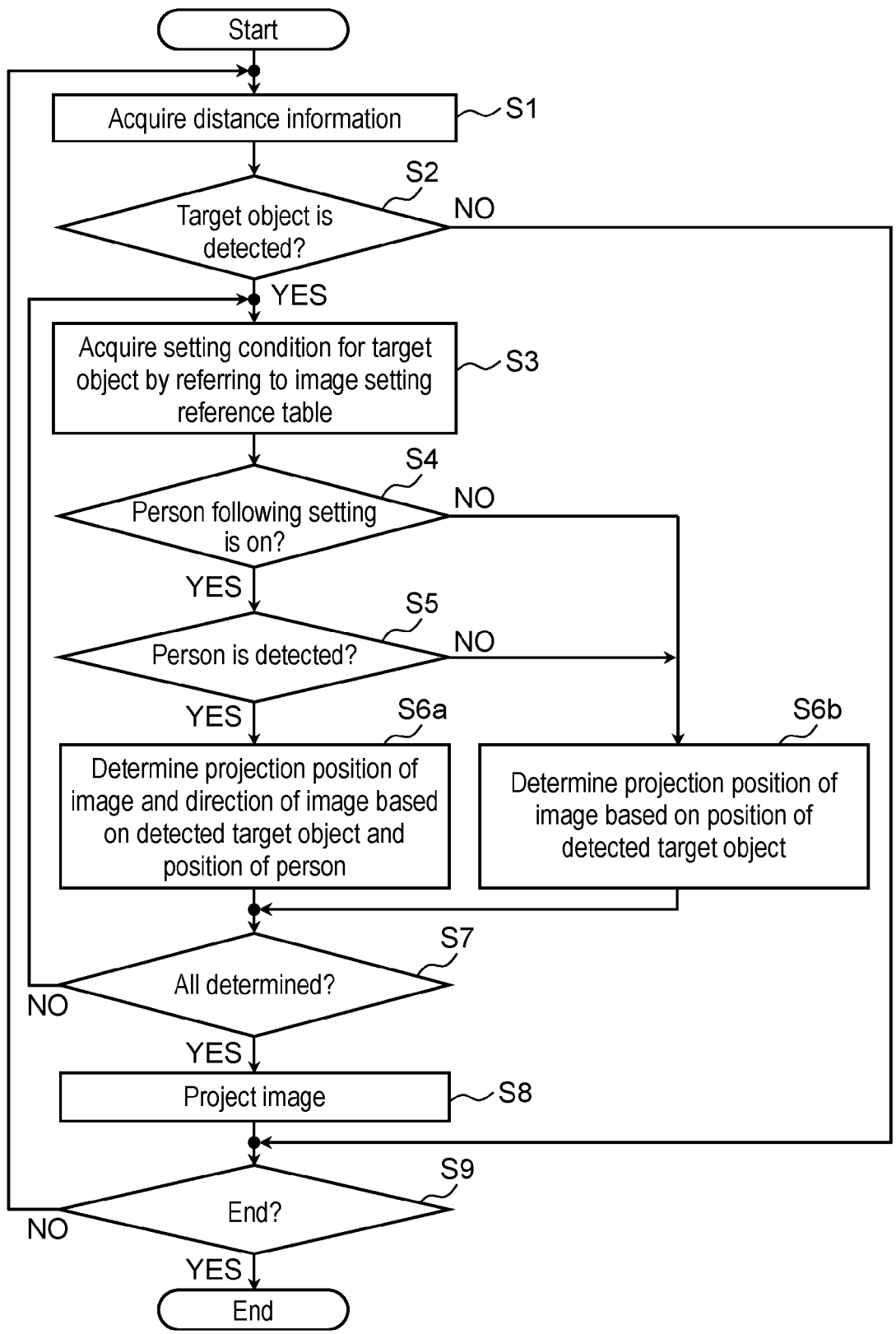
FIG. 8 is a flowchart illustrating an image projection operation according to the first exemplary embodiment.
Figure 9:
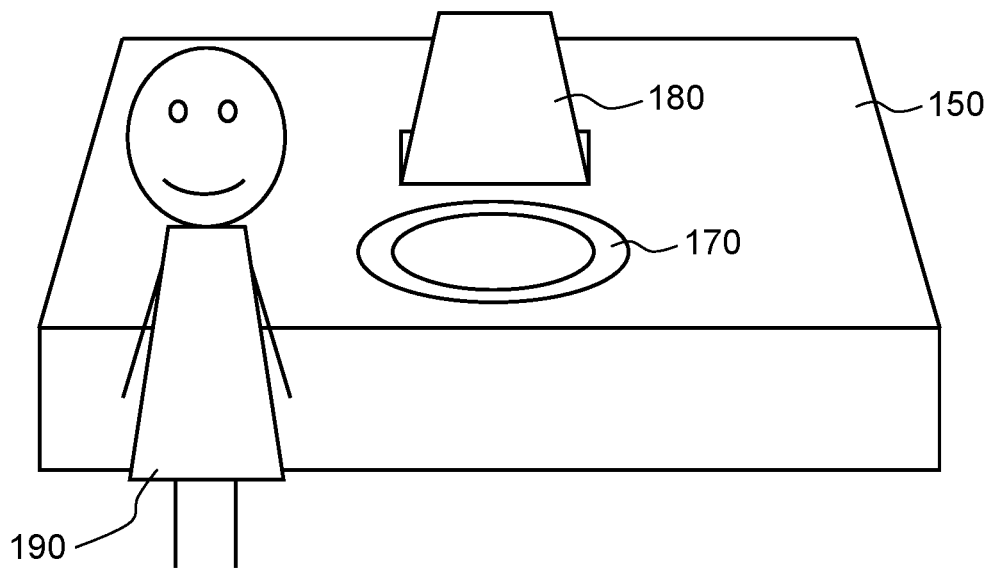
FIG. 9 is a schematic diagram illustrating a state in which a person is near a table on which a dish and an information board are set.
Figure 10:
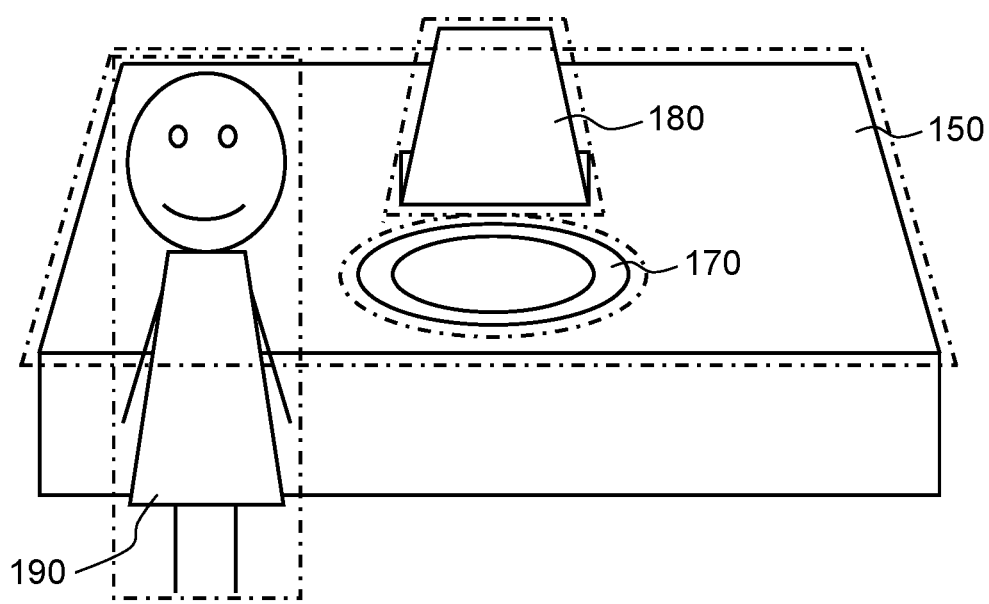
FIG. 10 is a schematic diagram describing object detection with a controller.

FIG. 8 is a flowchart illustrating an operation flow of projector device 100. FIG. 9 is a schematic diagram for describing the operation, and illustrates a state around projector device 100 viewed from projector device 100. In the state illustrated in FIG. 9, person 190 stands in front of table 150, and dish 170 and information board 180 are placed on table 150. FIG. 10 is a schematic diagram illustrating a detected object. The operation of projector device 100 will be described below in accordance with this state.

Controller 210 in projector device 100 acquires distance information from sensor unit 230 (step S1).

Controller 210 detects a target object based on the acquired distance information. Specifically, controller 210 performs a matching process to distance information (distance image) based on target object shape database 222 stored in memory 220, thereby detecting a target object from distance information. More specifically, controller 210 detects an object indicated by each characteristic amount registered in database 222 from the distance image, thereby detecting a target object.

In the example in FIG. 9, table 150, dish 170, and information board 180, which respectively correspond to "table A", "dish B", and "information board C" registered in database 222, are present around projector device 100, and person 190 is also present. As illustrated in FIG. 10, controller 210 detects target objects which are table 150, dish 170, and information board 180, and person 190.

Controller 210 may acquire a color image from an unillustrated RGB camera, instead of the distance information, and perform a matching process based on the color image to execute object detection. The matching process may be performed based on statistical data of a target object shape with machine learning.

Controller 210 determines whether a target object is detected or not (step S2). When a target object is detected (YES in step S2), the process proceeds to step S3. When a target object is not detected (NO in step S2), the process proceeds to step S9. In the state illustrated in FIG. 10, table 150, dish 170, and information board 180 which are target objects are detected. Then, the process proceeds to step S3.

Controller 210 acquires a setting condition of "table A" by referring to image setting reference table 221 in FIG. 7A for table 150 which is one of the detected target objects (step S3).

Controller 210 determines whether the person following setting is set to be ON or not for "table A" by referring to image setting reference table 221 (step S4). Since the person following setting is set to be ON for "table A" which is a target object (YES in step S4), the process proceeds to step S5.

Controller 210 determines whether a person is detected or not (step S5). In the state illustrated in FIG. 10, person 190 is detected (YES in step S5). Therefore, the process proceeds to step S6a.

According to the setting condition (image setting reference table 221), position flag 221db and direction flag 221dc of person following setting 221d are both set to be "YES" for "table A". Therefore, controller 210 determines the projection position and direction of content A (image of a user interface for menu operation) that should be projected on table 150 within the projection region (on table 150) based on the position of the detected person (step S6a). More specifically, controller 210 obtains a region having a predetermined positional relation with the person out of regions on table 150, and determines a projection direction such that the vertical direction or horizontal direction of the projected image becomes right for the detected person.

Controller 210 determines whether the projection position and the like of the projection content are determined for all of the detected target object, or a target object (projection content for a target object) for which a projection position and the like have not yet been determined still remains (step S7). If a projection position and the like of a projection content are determined for all of the detected target objects (YES in step S7), the process proceeds to step S8. If a target object (projection content for a target object) for which a projection position and the like have not yet been determined remains (NO in step S7), the process proceeds to step S3. In the state illustrated in FIG. 10, table 150, dish 170, and information board 180 which are target objects are detected, and projection position and the like of the projection content have not yet been determined for dish 170 and information board 180. Then, the process proceeds to step S3.

Returning to step S3, controller 210 acquires a setting condition of "dish B" by referring to image setting reference table 221 in FIG. 7A for dish 170 which is one of the detected target objects (step S3).

Controller 210 determines whether the person following setting is set to be ON or not for "dish B" by referring to image setting reference table 221 (step S4). Since the person following setting is set to be ON for "dish B" which is a target object (YES in step S4), the process proceeds to step S5.

Controller 210 determines whether a person is detected or not (step S5). In the state illustrated in FIG. 10, person 190 is detected (YES in step S5). Therefore, the process proceeds to step S6a.

According to the setting condition (image setting reference table 221), position flag 221db of person following setting 221d is set to be "NO", and direction flag 221dc is set to be "YES" for "dish B". Therefore, controller 210 determines the projection direction of content B (image of food) that should be projected on dish 170 based on the position of the detected person (step S6a). More specifically, controller 210 determines the projection position to be a predetermined position (e.g., center) in a region on dish 170, and determines a projection direction such that the vertical direction or horizontal direction of the projected image becomes right for the detected person.

Controller 210 determines whether the projection position and the like of the projection content are determined for all of the detected target object, or a target object (projection content for a target object) for which a projection position and the like have not yet been determined still remains (step S7). In the state illustrated in FIG. 10, table 150, dish 170, and information board 180 which are the target objects are detected, and projection position and the like of the projection content have not yet been determined for information board 180. Then, the process proceeds to step S3.

Returning to step S3, controller 210 acquires a setting condition of "information board C" by referring to image setting reference table 221 in FIG. 7A for information board 180 which is the remaining one of the detected target objects (step S3).

Controller 210 determines whether the person following setting is set to be ON or not for "information board C" by referring to image setting reference table 221 (step S4). Since the person following setting is set to be OFF for "information board C" which is a target object (NO in step S4), the process proceeds to step S6b.

Controller 210 determines the projection position and the like of content C (image of food information) that should be projected on information board 180 without depending on whether a person is detected or not (step S6b). More specifically, controller 210 determines the projection position to be a predetermined position (e.g., center) in the region on information board 180, and determines the projection direction in a predetermined direction.

In the state illustrated in FIG. 10, projection position and the like of the projection content have been determined for all of table 150, dish 170, and information board 180 which are the detected target objects. Then, the process proceeds to step S8.

Controller 210 generates image data of a projection image including the projection contents based on the determined position and the like. Then, controller 210 controls light source unit 300, image generation unit 400, and projection optical system 500 to project the projection image (step S8). In this case, controller 210 may perform a process such as a geometric correction to the image data stored in projection content database 223 in order that the image is displayed with a right shape when it is projected.

In step S9, controller 210 determines whether it keeps on projecting the projection content or ends the projection. When keeps on projecting, controller 210 returns to step S1, and again performs processes from steps S1 to S7. With this, projector device 100 can project a projection content, while changing the position and direction of the projection content by following a movement of a person (position change).

Figure 11:
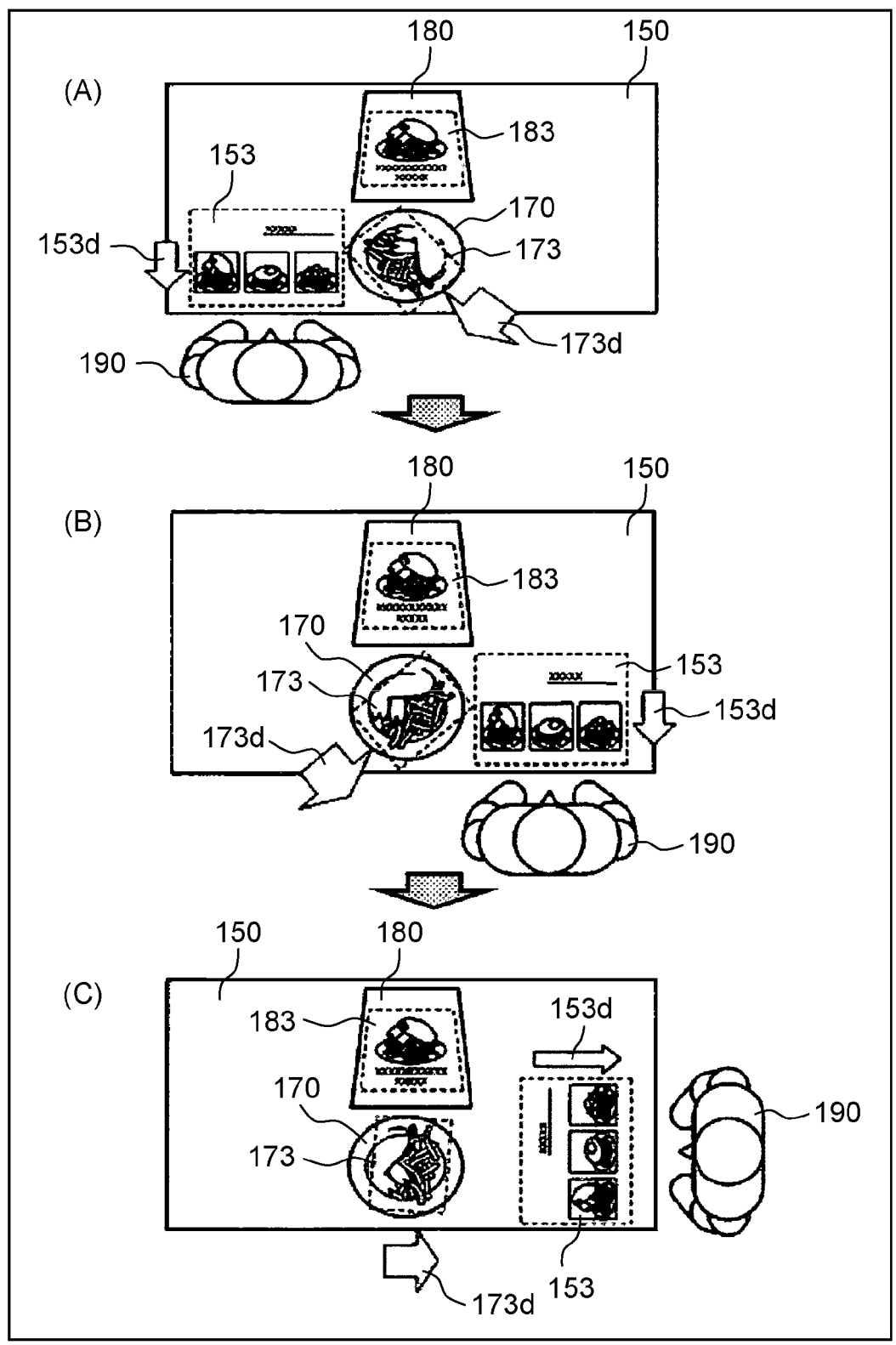
FIG. 11 is a schematic diagram illustrating a state in which a position and/or direction of a projection content is changed according to a movement of a person.

FIG. 11 is a schematic diagram illustrating the state in which projections of two or more projection contents are changed while person 190 moves around table 150.

As illustrated in FIGS. 11(A), (B), and (C), person following setting 221d is set to be ON, position flag 221db and direction flag 221dc are both set to be "YES" for projection content 153. Therefore, projection content 153 is projected in a region having a predetermined positional relation with person 190 in a region on table 150 such that the vertical direction of the projected image becomes the right direction (arrow 153d) for person 190. Specifically, when person 190 moves, projector device 100 projects projection content 153, while changing the projection position and direction according to the position of person 190.

On the other hand, person following setting 221d is set to be ON, position flag 221db is set to be "NO", and direction flag 221dc is set to be "YES" for projection content 173. Therefore, projection content 173 is projected on a predetermined position (e.g., a center of dish 170) in a region on dish 170 such that the vertical direction of the projected image becomes the right direction (arrow 173d) for person 190. Specifically, when person 190 moves, projector device 100 projects projection content 173, while changing the projection direction according to the position of person 190.

Finally, person following setting 221d of projection content 183 is set to be OFF. Therefore, projection content 183 is projected at a predetermined position (e.g., the center of information board 180) within a region of information board 180 with the projection direction determined in a predetermined direction. Specifically, projector device 100 projects projection content 183 on the predetermined position without depending on the position of person 190.

As described above, projector device 100 repeatedly performs the processes from steps S1 to S8, thereby being capable of projecting a projection content associated with a target object by following a person. Along with this, projector device 100 can project a projection content associated with a specific target object on a predetermined region without depending on a position of a person.

[1-4. Effect, Etc.]

When there are a projection content whose projection position and the like are desirably changed according to a position of a moving object (e.g., person) and a projection content which is desirably projected on a predetermined object on which the projection content is to be projected without depending on a position of a moving object (e.g., person), projector device 100 according to the first exemplary embodiment can project the former projection content by changing the image (the projection position or direction) according to the position of the person, and at the same time, projector device 100 can project the latter projection content without depending on of the position of the person.

Second Exemplary Embodiment

A second exemplary embodiment will be described next with reference to FIGS. 12 to 15.

[2-1. Brief Summary]

In projector device 100 according to the second exemplary embodiment, a configuration of image setting reference table 321 stored in memory 220 is different from image setting reference table 221 in the first exemplary embodiment. Projector device 100 according to the second exemplary embodiment has an operation different from the operation of projector device 100 according to the first exemplary embodiment. Projector device 100 according to the second exemplary embodiment projects a projection content associated with a specific target object on a predetermined position, and projects a projection content not associated with a specific target object by changing the projection position or direction according to a position of a person.

[2-2. Configuration]

Projector device 100 according to the second exemplary embodiment is similar to projector device 100 according to the first exemplary embodiment in the electrical configuration and optical configuration. Therefore, the description for these configurations will not be repeated.

As described above, projector device 100 according to the second exemplary embodiment is characterized by image setting reference table 321 stored in memory 220. Image setting reference table 321 will be described below with reference to FIGS. 12 and 13.

Figures 12, 13:
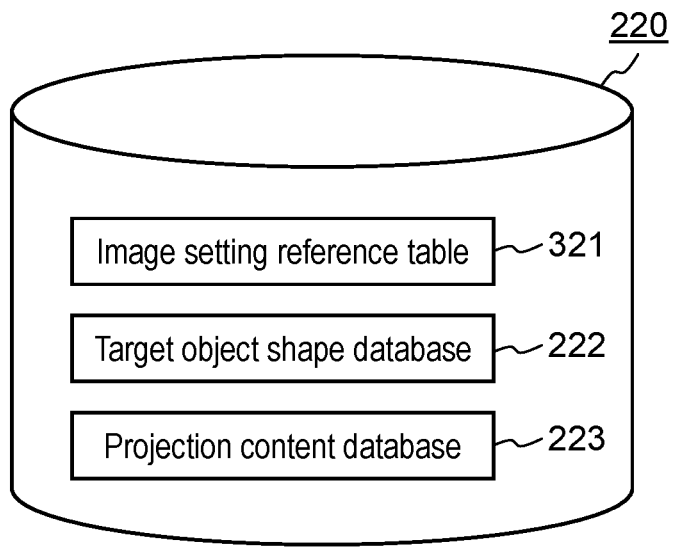
FIG. 12 is a schematic diagram for describing data stored in a memory according to a second exemplary embodiment.
FIG. 13 is a diagram illustrating a detail of an image setting reference table according to the second exemplary embodiment.

As illustrated in FIG. 12, memory 220 of projector device 100 stores image setting reference table 321, target object shape database 222, and projection content database 223. Target object shape database 222 and projection content database 223 are similar to those in the first exemplary embodiment, so that the description thereof will be omitted.

FIG. 13 is a diagram illustrating the detail of image setting reference table 321. Image setting reference table 321 manages target object 321*a*, projection content 321*b*, and projection region 321*c* of an image in association with one another.

Target object 321*a* is information indicating an object which should be detected with the object detection. In FIG. 13, "---" (no target object), "dish B", and "information board C" are managed as the information indicating a target object. As will be described below, the projection content ("content A") managed as "---" (no target object) means the projection content which should be projected near (projection region) a detected person, when the person is detected.

Projection content 321*b* is information relating to an image which should be projected when a target object is detected. This information includes a link with image data stored in projection content database 223. In FIG. 13, contents A, B, and C are managed as the information indicating projection images.

Projection region 321*c* is information relating to a region where an image should be projected when a target object is detected. In FIG. 13, "near person" is specified for content A as information indicating a region where an image should be projected. This specifies that, when a person is detected, "content A" should be projected near this person.

As described above, image setting reference table 321 does not manage the information pieces relating to the person following setting, different from image setting reference table 221 in the first exemplary embodiment. In image setting reference table 321, projection content (content A) that should be projected by following a person is managed without being in association with a specific target object. With this configuration, as for a projection content whose projection position and/or direction is desirably changed according to a position of a person, projector device 100 can project the projection content by determining the position and/or direction according to the position of the person, when detecting the person. On the other hand, as for a projection content which is desirably projected on a predetermined object on which the projection content is to be projected without depending on a position of a person, projector device 100 can determine a position where the projection content should be projected, and the like without depending on the position of the person, and project the projection content.

[2-3. Operation]

Next, an operation of projector device 100 will be described with reference to FIGS. 14 and 15.

Figure 14:
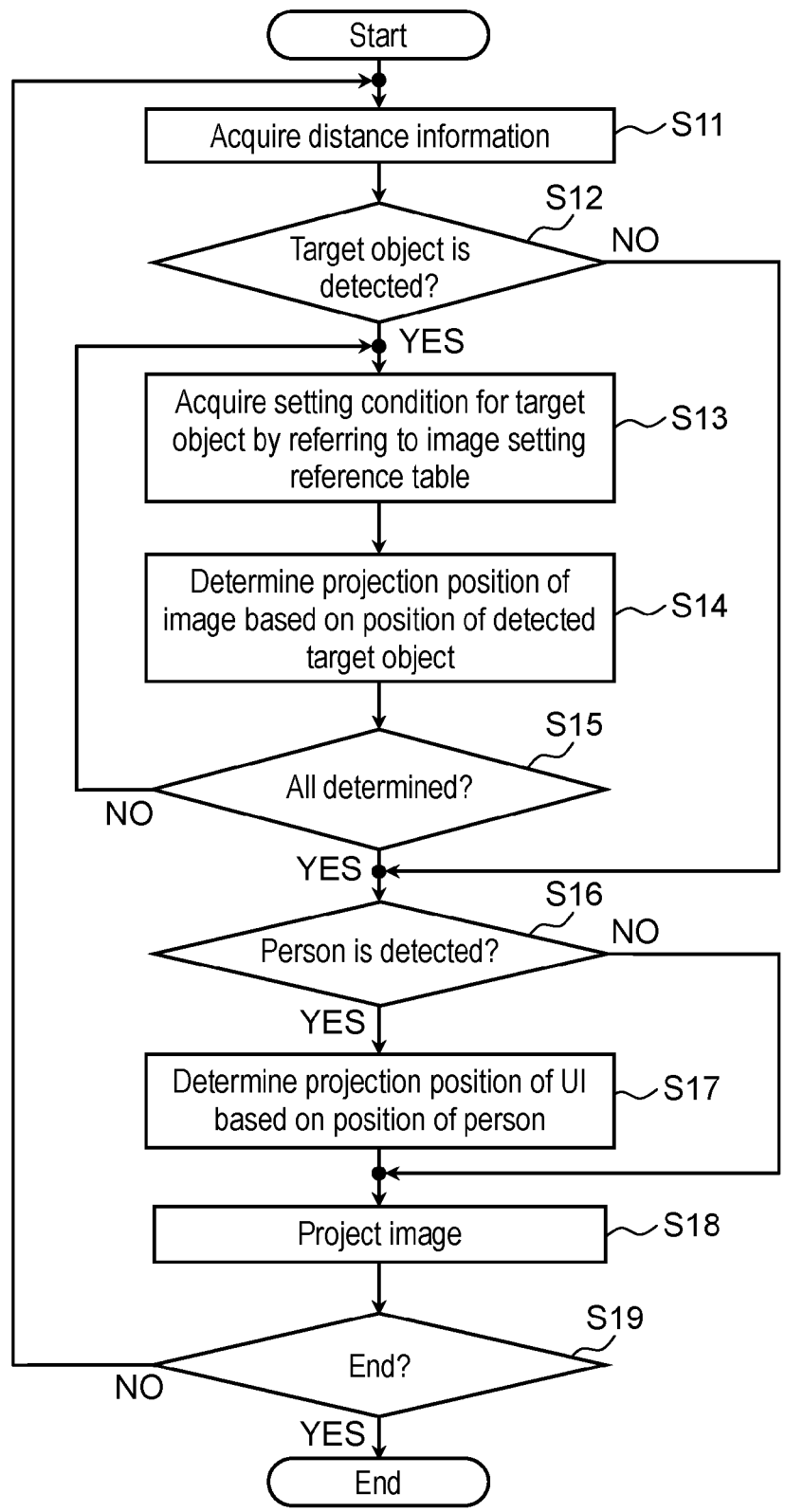
FIG. 14 is a flowchart illustrating an image projection operation according to the second exemplary embodiment.
Figure 15:
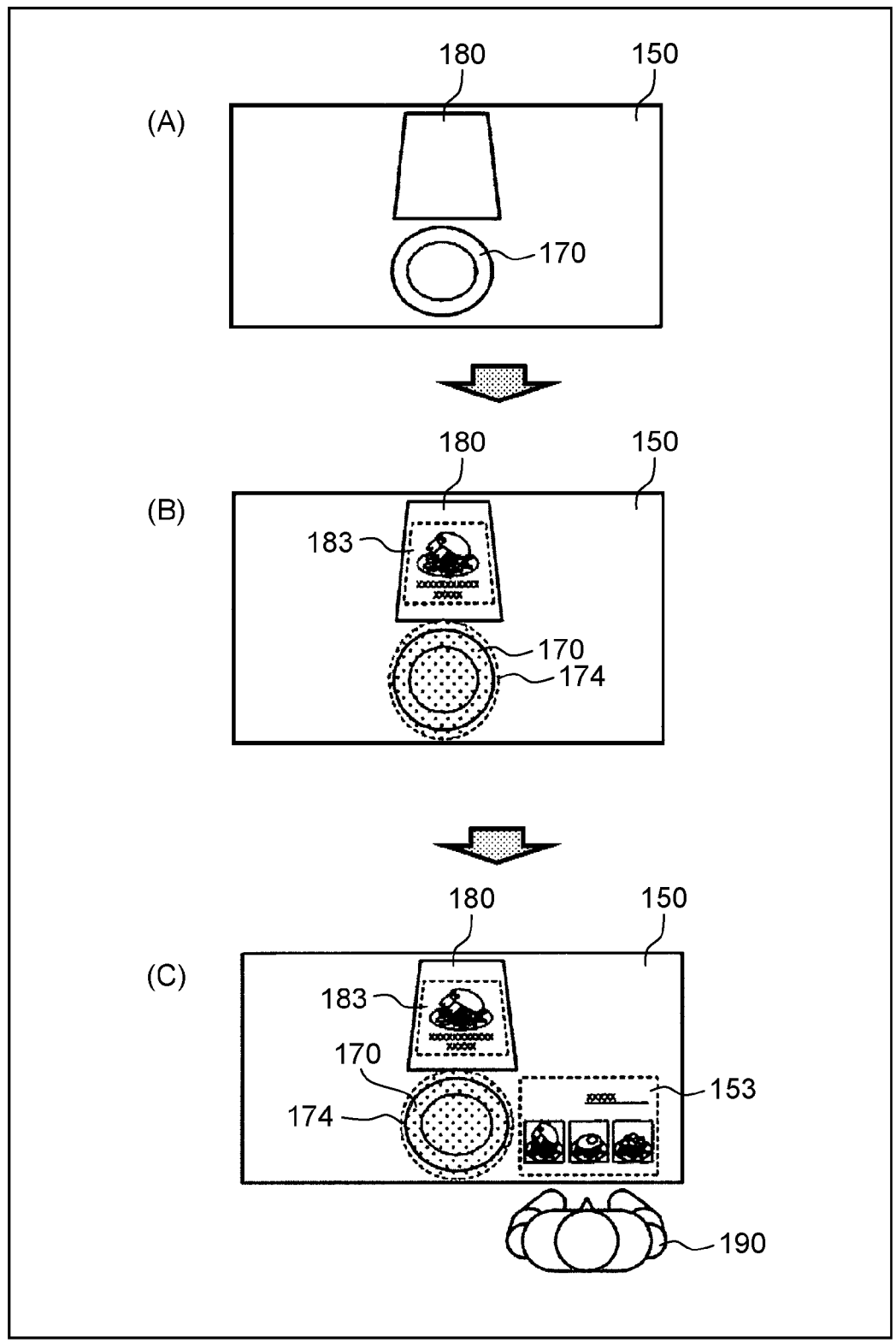
FIG. 15 is a schematic diagram illustrating a state in which a position and/or direction of a projection content is changed according to a movement of a person.

FIG. 14 is a flowchart illustrating an operation flow of projector device 100. FIG. 15 is a schematic diagram illustrating a state in which a position and/or direction of a projection content is changed according to a movement of a person. FIG. 15(A) is a diagram illustrating the state in which table 150 on which dish 170 and information board 180 are placed is viewed from top. FIGS. 15(B) and (C) are schematic diagrams illustrating the state in which projection contents A to C are projected. The operation of projector device 100 will be described below by using the states illustrated in FIGS. 15(A) to (C).

Controller 210 in projector device 100 acquires distance information from sensor unit 230 (step S11).

Controller 210 detects a target object based on the acquired distance information. In the state illustrated in FIG. 15(A), controller 210 detects dish 170 as "dish B", and information board 180 as "information board C".

Controller 210 determines whether a target object is detected or not (step S12). When a target object is detected (YES in step S12), the process proceeds to step S13. When a target object is not detected (NO in step S12), the process proceeds to step S16. In the state illustrated in FIG. 15(A), dish 170 and information board 180 are detected. Then, the process proceeds to step S13.

Controller 210 acquires a setting condition of "dish B" by referring to image setting reference table 321 in FIG. 13 for dish 170 which is one of the detected target objects (step S13).

Controller 210 determines a projection position and the like of content B (here, an image with illumination for projecting an image on a black background) which should be projected on dish 170 based on the setting condition by referring to image setting reference table 321 (step S14). Here, controller 210 determines the projection position of projection content B on a predetermined position (e.g., center) within the region on dish 170.

Controller 210 determines whether the projection position and the like of the projection content are determined for all of the detected target objects, or a target object (projection content for a target object) for which a projection position and the like have not yet been determined still remains (step S15). In the state illustrated in FIG. 15(A), dish 170 and information board 180 are detected, and projection position and the like of the projection content have not yet been determined for information board 180. Then, the process proceeds to step S13.

Controller 210 acquires a setting condition of "information board C" by referring to image setting reference table 321 in FIG. 13 for information board 180 which is the remaining one of the detected target objects (step S13).

Controller 210 determines a projection position and the like of content C (here, an image of food information) which should be projected on information board 180 based on the setting condition by referring to image setting reference table 321 (step S14). Here, controller 210 determines the projection position of projection content C on a predetermined position (e.g., center) within the region on information board 180.

In the state illustrated in FIG. 15(A), projection position and the like of the projection content have all been determined for detected dish 170 and information board 180. Then, the process proceeds to step S16.

Controller 210 determines whether a person is detected or not from the distance information acquired in step S11 (step S16). In the state illustrated in FIG. 15(A), projector device 100 does not detect a person, so that the process proceeds to step S18.

Controller 210 generates image data of a projection image including the projection contents based on the determined position and the like. Then, controller 210 controls light source unit 300, image generation unit 400, and projection optical system 500 to project the projection image (step S18). With this, projection contents 174 and 183 are projected as illustrated in FIG. 15(B). Projection content 174 (image with illumination for projecting an image on a black background) is projected on dish 170. Projection content 183 is projected at a predetermined position (e.g., the center of information board 180) within a region on information board 180.

In step S19, controller 210 determines whether it keeps on projecting the projection content or ends the projection. When keeps on projecting, controller 210 returns to step S11, and again performs processes from steps S11 to S18.

At the point of the state illustrated in FIG. 15(C), controller 210 acquires distance information from sensor unit 230 (step S11). Controller 210 detects a target object based on the acquired distance information. In the state illustrated in FIG. 15(C), controller 210 detects dish 170 as "dish B", and information board 180 as "information board C" as in the states illustrated in FIGS. 15(A) and 15(B), and further detects person 190.

Controller 210 performs the processes in steps S11 to S15, similar to the point illustrated in FIGS. 15(A) and (B). Then, the process proceeds to step S16.

Controller 210 determines whether a person is detected or not from the distance information acquired in step S11 (step S16). In the state illustrated in FIG. 15(C), projector device 100 detects a person, so that the process proceeds to step S17.

Controller 210 acquires the setting condition of "---" (no target object) by referring to image setting reference table 321 in FIG. 13. The setting condition specifies that the projection content "content A" (menu operation UI) should be projected near the projection region "near person". Therefore, controller 210 determines the region near person 190 (the region apart from person 190 by a predetermined distance) as a projection region (step S17).

Controller 210 controls light source unit 300, image generation unit 400, and projection optical system 500 to project the projection content (step S18). In the state illustrated in FIG. 15(C), projection contents 174, 183, and 153 are projected. Projection contents 174 and 183 are projected in a similar way to the case illustrated in FIG. 15(B) in which person 190 is not present, and projection content 153 is projected near person 190.

As described above, projector device 100 repeatedly performs the processes from steps S11 to S18, thereby being capable of projecting a projection content associated with a specific target object on a predetermined region, and projecting a specific projection content near a person by following the position of the person.

In image setting reference table 321 illustrated in FIG. 13, content A is not associated with a specific target object. However, content A may directly be associated with a "person" as a target object.

[2-4. Effect, Etc.]

When there are a projection content whose projection position and the like are desirably changed according to a position of a moving object (e.g., person) and a projection content which is desirably projected on a predetermined object on which the projection content is to be projected without depending on a position of a moving object (e.g., person), projector device 100 according to the second exemplary embodiment can project the former projection content by changing the image (the projection position or direction) according to the position of the person, and at the same time, projector device 100 can project the latter projection content without depending on the position of the person.

Third Exemplary Embodiment

A third exemplary embodiment will be described next with reference to FIGS. 16 to 20.

[3-1. Brief Summary]

In projector device 100 according to the third exemplary embodiment, a configuration of image setting reference table 421 stored in memory 220 is different from image setting reference tables 221 and 321 in the first and second exemplary embodiments. In addition, projector device 100 is different from projector devices in the first and second exemplary embodiments in that it has person following setting reference table 521 described below. Projector device 100 according to the third exemplary embodiment projects a projection content after determining whether to allow a position and the like of the projection content associated with each of specific target objects to follow a position of a person or not based on the characteristic of the shape of each of the specific target objects.

[3-2. Configuration]

Projector device 100 according to the third exemplary embodiment is similar to projector device 100 according to the first and second exemplary embodiments in the electrical configuration and optical configuration. Therefore, the description for these configurations will not be repeated.

As described above, projector device 100 according to the third exemplary embodiment is characterized by image setting reference table 421 and person following setting reference table 521 stored in memory 220. Image setting reference table 421 and person following setting reference table 521 will be described below with reference to FIGS. 16 and 17.

Figure 16:
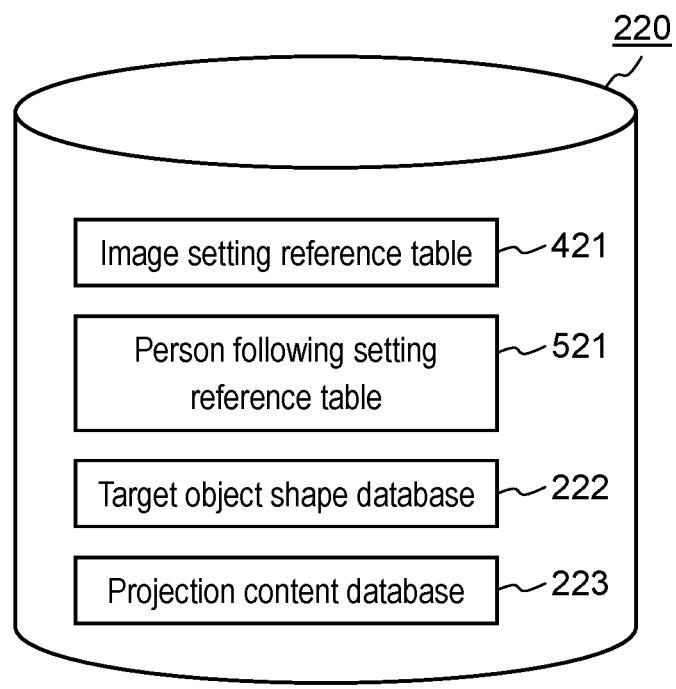
FIG. 16 is a schematic diagram for describing data stored in a memory according to a third exemplary embodiment.

As illustrated in FIG. 16, memory 220 of projector device 100 stores image setting reference table 421, person following setting reference table 521, target object shape database 222, and projection content database 223. Target object shape database 222 and projection content database 223 are similar to those in the first exemplary embodiment, so that the description thereof will be omitted.

FIG. 17A is a diagram illustrating the detail of image setting reference table 421. Image setting reference table 421 manages target object 421a, projection content 421b, and projection region 421c of an image in association with one another. Image setting reference table 421 manages the information pieces similar to image setting reference table 321 in the second exemplary embodiment.

FIG. 17B is a diagram illustrating the detail of person following setting reference table 521. Person following setting reference table 521 is a table for switching a person following setting for a target object based on whether a plane of an target object is parallel to a later-described reference plane or not.

Briefly, person following setting 521b is set to be ON for a target object having a plane parallel to a reference plane (e.g., table 150) based on person following setting reference table 521. The detail will be described below. (Position flag 521bb is set to be "NO", and direction flag 521bc is set to be "YES".) Person following setting 521b is set to be OFF for a target object having a plane not parallel to the reference plane.

Projector device 100 according to the third exemplary embodiment switches the person following setting according to whether a plane of a target object is parallel to the reference plane or not, and controls a projection position and/or direction of a projection content based on image setting reference table 421 and person following setting reference table 521. With this configuration, as for a projection content which should be projected on a target object (e.g., dish 170) having a plane parallel to the reference plane, projector device 100 can project the projection content by determining the position and/or direction according to a position of a person. On the other hand, as for a projection content which should be projected on a target object (e.g., information board 180) having a plane not parallel to the reference plane, projector device 100 can determine a position where the projection content should be projected, and the like without depending on a position of a person, and project the projection content.

[3-3. Operation]

Figure 19:
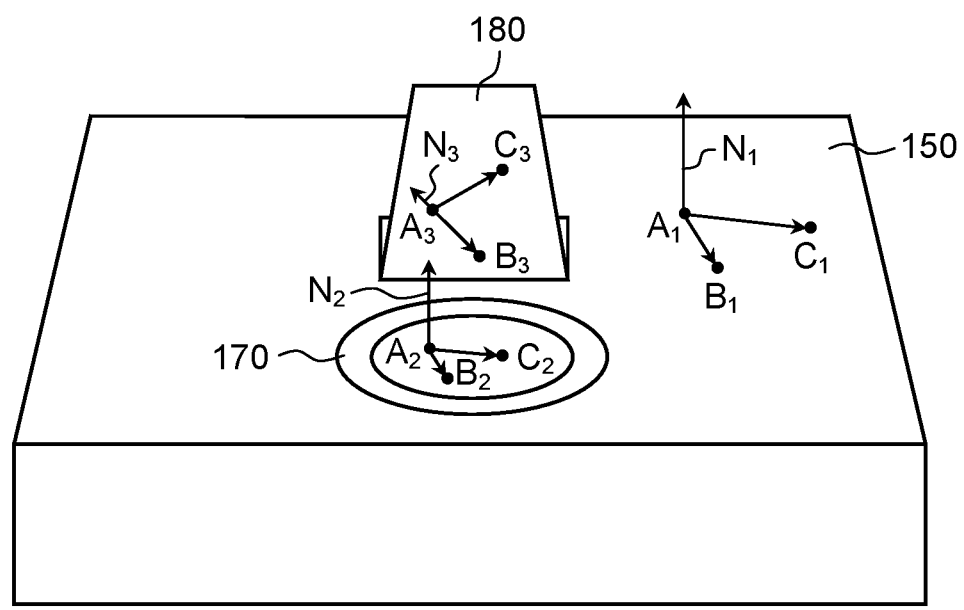
FIG. 19 is a schematic diagram describing acquisition of plane information pieces of a reference plane and a target object.
Figure 20:
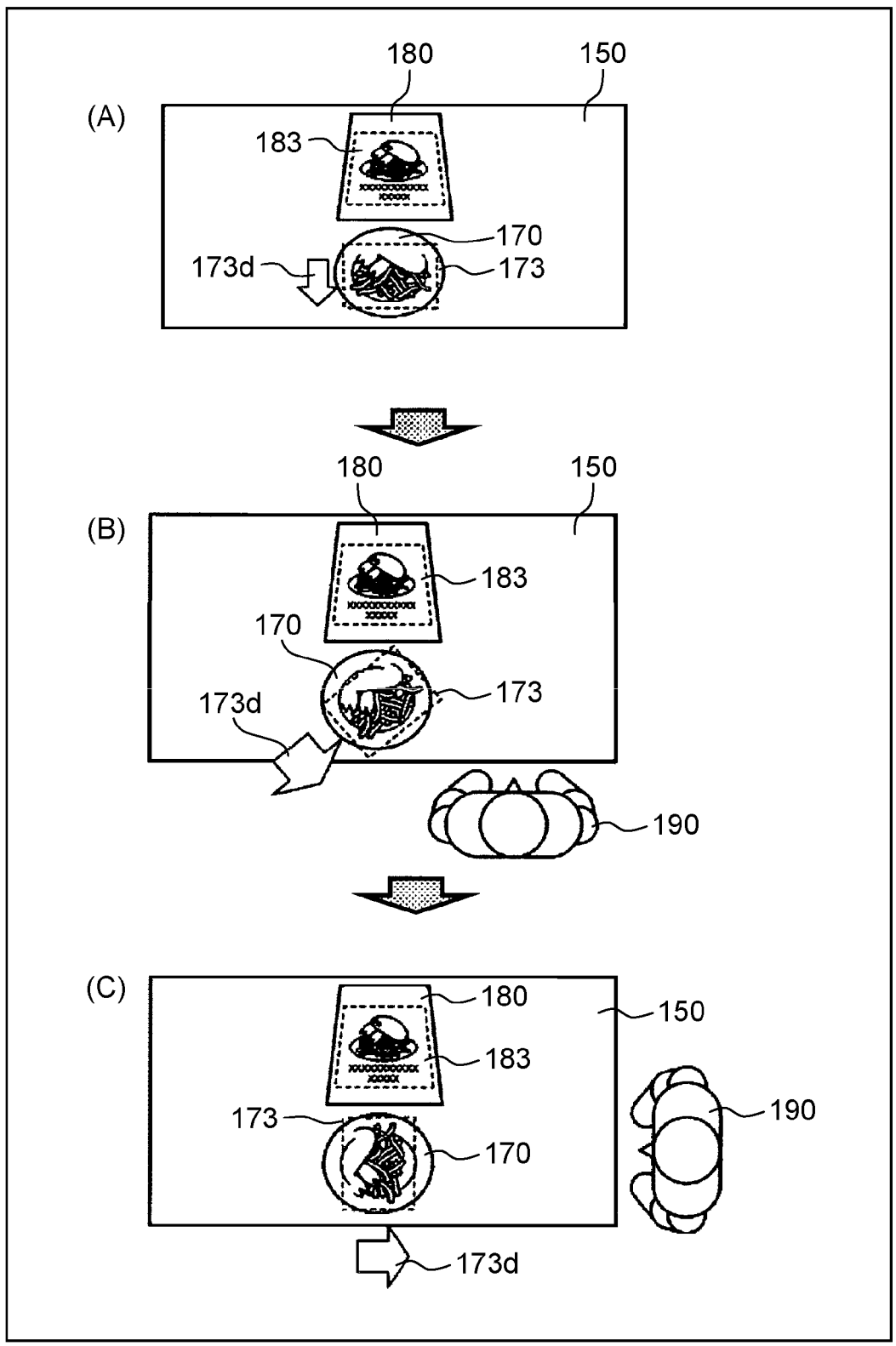
FIG. 20 is a schematic diagram illustrating a state in which a direction of a projection content is changed according to a movement of a person.

Next, an operation of projector device 100 will be described with reference to FIGS. 18 to 20.

Figure 18:
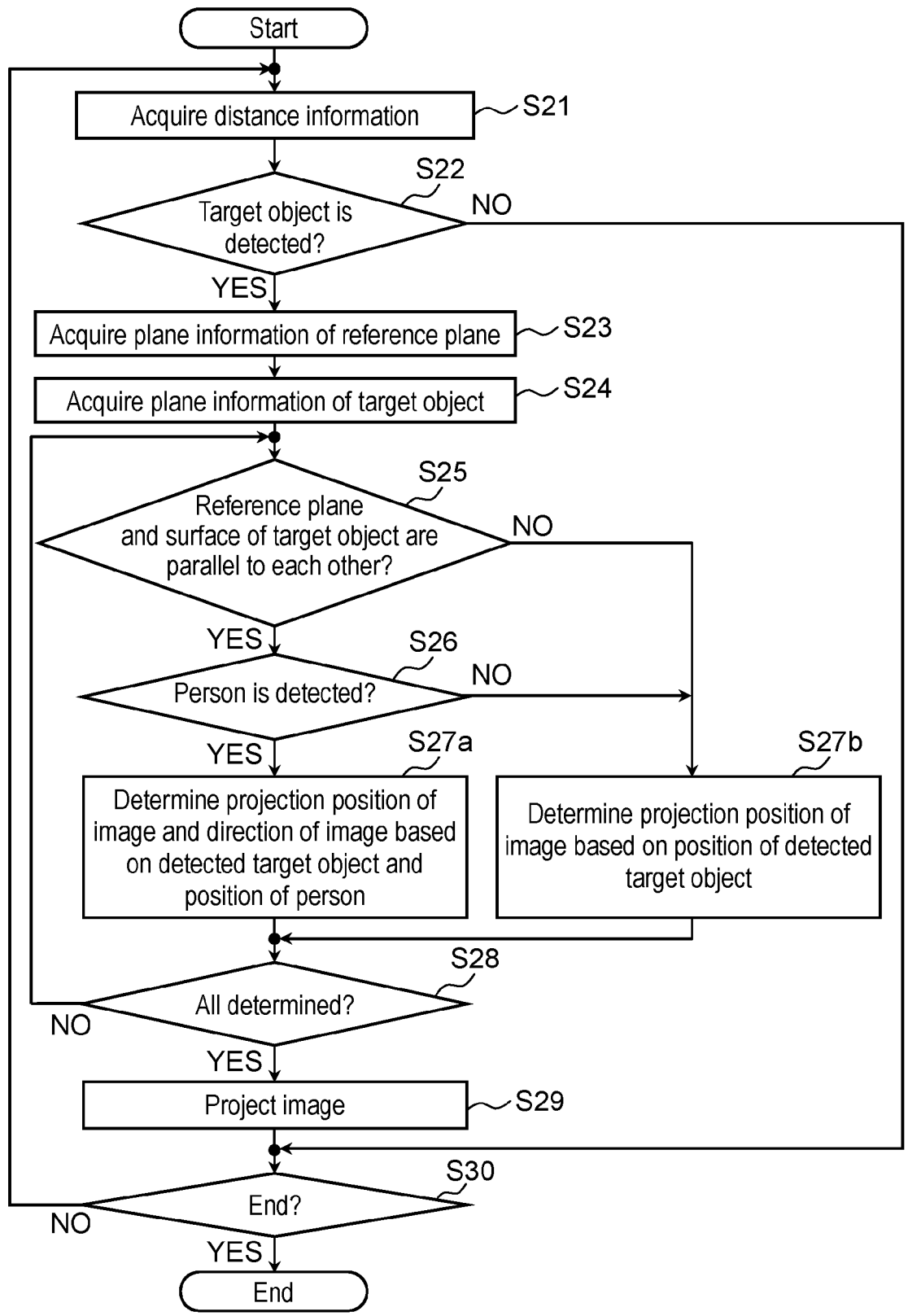
FIG. 18 is a flowchart illustrating an image projection operation according to the third exemplary embodiment.

FIG. 18 is a flowchart illustrating an operation flow of projector device 100. FIG. 19 is a diagram illustrating a state around projector device 100 viewed from projector device 100. A method of acquiring plane information of a reference plane and plane information of a target object will be described with reference to FIG. 19. In the state illustrated in FIG. 19, dish 170 and information board 180 are placed on table 150. FIG. 20 is a schematic diagram illustrating the state in which projection contents 173 and 183 are projected. The operation of projector device 100 will be described by using the state illustrated in FIG. 20 as one example.

Controller 210 in projector device 100 acquires distance information from sensor unit 230 (step S21).

Controller 210 detects a target object based on the acquired distance information. In the state illustrated in FIGS. 19 and 20(A), controller 210 detects table 150 forming a reference plane, dish 170 as "dish B", and information board 180 as "information board C".

Controller 210 determines whether a target object is detected or not (step S22). When a target object is detected (YES in step S22), the process proceeds to step S23. When a target object is not detected (NO in step S22), the process proceeds to step S30. In the state illustrated in FIG. 20(A), dish B and information board C are detected. Then, the process proceeds to step S23.

Controller 210 acquires plane information of a reference plane based on the distance information (step S23). The reference plane means a plane on which dish 170 or information board 180 which is a target object is placed, and a top of table 150 is selected as the reference plane, for example. Controller 210 derives an equation of a plane of the top of table 150 based on the distance information.

The method of deriving the equation of a plane will be described with reference to FIG. 19. Controller 210 selects any three points $A_1$, $B_1$, and $C_1$ in the reference plane (top of table 150), obtains coordinate values of point $A_1$, point $B_1$, and point $C_1$ in the triaxial orthogonal coordinate system (x, y, z) based on the distance information, and generates vector $A_1B_1$ and vector $A_1C_1$ based on these coordinate values. Controller 210 then obtains cross product vector $N_1$ of vector $A_1B_1$ and vector $A_1C_1$ through calculation. Controller 210 determines plane equation of a projection plane $a_1x+b_1y+c_1z+d_1=0$ based on the cross product vector $N_1$ and the coordinate values of point $A_1$ and the like. The information (i.e., coefficients $a_1$, $b_1$, $c_1$, $d_1$) of the plane equation of the reference plane derived as described above is stored in memory 220.

The case where a plane equation of a reference plane is derived after a target object is detected has been described above. However, the present disclosure is not limited thereto. Specifically, a plane equation of a plane (top of table 150) on which a target object is to be placed may be derived before the target object is detected. Alternatively, even when a plane equation of a reference plane is derived after a target object is detected, distance information to be referred to may be acquired before the target object is detected. In this case, coordinate values of any three points of $A_1$, $B_1$, and $C_1$ may be acquired and stored in memory 220 based on distance information of a plane (top of table 150) on which a target object is to be placed, before the target object is detected.

Next, controller 210 acquires plane information about the surface of the target object from the distance information as in step S23 (step S24). Specifically, controller 210 obtains normal vectors $N_2$ and $N_3$ for each of dish 170 and information board 180, and derives plane equation $a_2x+b_2y+c_2z+d_2=0$ for the surface of dish 170 and plane equation $a_3x+b_3y+c_3z+d_3=0$ for the surface of information board 180 as illustrated in FIG. 19 based on the distance information.

Then, controller 210 determines whether or not the surface of dish 170 and table 150 serving as a reference plane are parallel to each other with respect to dish 170 which is one of the detected target objects (step S25). Specifically, controller 210 obtains an inner product of normal vector $N_1$ of table 150 and normal vector $N_2$ of the surface of dish 170, and determines whether two planes are parallel (or almost parallel) to each other or not based on the obtained inner product. However, the method for determining whether they are parallel or not is not limited thereto.

It is supposed here that normal vector $N_1$ of table 150 and normal vector $N_2$ of dish 170 are almost parallel to each other. Therefore, the determination in step S25 for dish 170 becomes "YES", so that the process proceeds to step S26.

Controller 210 determines whether a person is detected or not from the distance information acquired in step S21 (step S26). When a person is detected (YES in step S26), the process proceeds to step S27a, and when a person is not detected (NO in step S26), the process proceeds to step S27b. For example, in the state illustrated in FIG. 20(A), controller 210 does not detect a person. Therefore, the process proceeds to step S27b.

Controller 210 determines a projection position and the like of content B (here, image of food) which should be projected on dish 170 based on the setting condition in FIG. 17 by referring to image setting reference table 421 (step S27b). Here, controller 210 determines the projection position of projection content B on a predetermined position (e.g., center) within the region on dish 170.

Controller 210 determines whether the projection position and the like of the projection content are determined for all of the detected target objects, or a target object (projection content for a target object) for which a projection position and the like have not yet been determined still remains (step S28). In the state illustrated in FIG. 20(A), dish B and information board C are detected, and projection position and the like of the projection content have not yet been determined for information board C. Then, the process proceeds to step S25.

Controller 210 determines whether or not the surface of information board 180 and table 150 are parallel to each other with respect to information board 180 which is the remaining one of the detected target objects (step S25).

It is supposed here that normal vector $N_1$ of table 150 and normal vector $N_3$ of information board 180 are not parallel to each other. Therefore, the determination in step S25 for information board 180 becomes "NO", so that the process proceeds to step S27b.

Controller 210 determines a projection position and the like of projection content C (here, an image of food information) which should be projected on information board 180 based on the setting condition by referring to image setting reference table 421 in FIG. 17 (step S27b). Here, controller 210 determines the projection position of projection content C on a predetermined position (e.g., center) within the region on information board 180.

In the state illustrated in FIG. 20(A), projection position and the like of the projection content have all been determined for detected dish 170 and information board 180. Then, the process proceeds to step S29.

Controller 210 generates image data of a projection image including the projection contents based on the determined position and the like. Then, controller 210 controls light source unit 300, image generation unit 400, and projection optical system 500 to project the projection image (step S29). In the state illustrated in FIG. 20(A), projection contents 173 and 183 are projected. Projection content 173

(an image of food) is projected at a predetermined position (e.g., the center of dish 170) within a region on dish 170. Projection content 183 is projected at a predetermined position (e.g., the center of information board 180) within a region on information board 180.

In step S30, controller 210 determines whether it keeps on projecting the projection content or ends the projection. When keeps on projecting, controller 210 returns to step S21, and again performs processes from steps S21 to S29.

In the state illustrated in FIG. 20(B), controller 210 acquires distance information from sensor unit 230 (step S21). Controller 210 detects a target object based on the acquired distance information. In the state illustrated in FIG. 20(B), controller 210 detects dish 170 as "dish B", and information board 180 as "information board C" as in the state illustrated in FIG. 20(A), and further detects person 190.

Controller 210 performs the processes in steps S21 to S25, similar to the point illustrated in FIG. 20(A). Then, the process proceeds to step S26.

Controller 210 determines whether a person is detected or not from the distance information acquired in step S21 (step S26). In the state illustrated in FIG. 20(B), projector device 100 detects a person, so that the process proceeds to step S27a.

According to the setting condition (person following setting reference table 521), person following setting 521ba is set to be ON, and direction flag 521bc is set to be "YES" for a target object having a plane parallel to the reference plane. Therefore, controller 210 determines the projection direction of content B (image of food) that should be projected on dish 170 within the projection region (on table 150) based on the position of the detected person (step S27a). Controller 210 determines a projection direction such that the vertical direction or the horizontal direction of an image to be projected becomes right for the detected person within the region on dish 170.

Controller 210 determines whether the projection position and the like of the projection content are determined for all of the detected target objects, or a target object (projection content for a target object) for which a projection position and the like have not yet been determined still remains (step S28). In the state illustrated in FIG. 20(B), dish B and information board C are detected, and projection position and the like of the projection content have not yet been determined for information board C. Then, the process proceeds to step S25.

Controller 210 determines whether or not the surface of information board 180 and table 150 serving as a reference plane are parallel to each other with respect to information board 180 which is the remaining one of the detected target objects (step S25).

It is supposed here that normal vector $N_1$ of table 150 and normal vector $N_3$ of information board 180 are not parallel to each other. Therefore, the determination in step S25 for information board 180 becomes "NO", so that the process proceeds to step S27b.

Controller 210 determines a projection position and the like of projection content C (here, an image of food information) which should be projected on information board 180 based on the setting condition by referring to image setting reference table 421 in FIG. 17 (step S27b). Here, controller 210 determines the projection position of projection content 183 on a predetermined position (e.g., center) within the region on information board 180.

In the state illustrated in FIG. 20(B), projection position and the like of the projection content have all been determined for detected dish B and information board C. Then, the process proceeds to step S29.

Controller 210 generates image data of a projection image including the projection contents based on the determined position and the like. Then, controller 210 controls light source unit 300, image generation unit 400, and projection optical system 500 to project the projection image (step S29). In the state illustrated in FIG. 20(B), projection contents 173 and 183 are projected. Projection content 173 (image of food) is projected on a predetermined position (e.g., a center of dish 170) in a region on dish 170 such that the projected image has right directions for allowing person 190 to easily see this content. Projection content 183 is projected at a predetermined position (e.g., the center of information board 180) within a region on information board 180.

In step S30, controller 210 determines whether it keeps on projecting the projection content or ends the projection. When keeps on projecting, controller 210 returns to step S21, and again performs processes from steps S21 to S29.

As described above, projector device 100 according to the third exemplary embodiment determines a position where the projection content should be projected and projects a projection content after determining whether to allow a position and/or direction of the projection content associated with each of specific target objects to follow a position of a person or not based on the characteristic of the shape of each of the specific target objects by referring to person following setting reference table 521. FIG. 20(C) is a schematic diagram illustrating a state in which person 190 moves to the right of table 150 as viewed from top. Even in the state illustrated in FIG. 20(C), projection content 173 projected on dish 170 is projected with a right direction for allowing person 190 to easily see this content, and projection content 183 projected on information board 180 is projected on a predetermined position without depending on the position of the person.

As described above, projector device 100 determines whether a region on which a projection content should be projected is parallel to a reference plane (table 150) or not. If the region on which the projection content should be projected is parallel to the reference plane, projector device 100 variably controls the position or direction of the projection content, which should be projected on this region, according to a position of a detected person. If the region on which the projection content should be projected is not parallel to the reference plane, projector device 100 constantly controls the position and/or direction of the projection content, which should be projected on this region, without depending on the position of the detected person.

[3-4. Effect, Etc.]

When there are a projection content whose projection position and the like are desirably changed according to a position of a moving object such as a person and a projection content which is desirably projected on a predetermined object on which the projection content is to be projected without depending on a position of a moving object, projector device 100 according to the third exemplary embodiment can project the former projection content by changing the image (the projection position and/or direction) according to the position of the person, and at the same time, projector device 100 can project the latter projection content without depending on the position of the person.

Fourth Exemplary Embodiment

A fourth exemplary embodiment will be described next with reference to FIGS. 21 to 27.

[4-1. Brief Summary]

In projector device 100 according to the fourth exemplary embodiment, configurations of image setting reference table 621 and person following setting reference table 721 stored in memory 220 are different from person following setting reference table 521 in the third exemplary embodiment. Projector device 100 according to the fourth exemplary embodiment records and holds states of a region on which an image is to be projected and its surroundings, determines whether projector device 100 allows a position and/or direction of a projection content to follow a position of a person or not based on a difference between an initial state and a state in which an image is actually projected, and then, projects the projection content.

[4-2. Configuration]

Projector device 100 according to the fourth exemplary embodiment is similar to projector device 100 according to the first, second, and third exemplary embodiments in the electrical configuration and optical configuration. Therefore, the description for these configurations will not be repeated.

Projector device 100 according to the fourth exemplary embodiment is characterized by image setting reference table 621 and person following setting reference table 721 stored in memory 220. Image setting reference table 621 and person following setting reference table 721 will be described below with reference to FIGS. 21 and 22.

Figure 21:
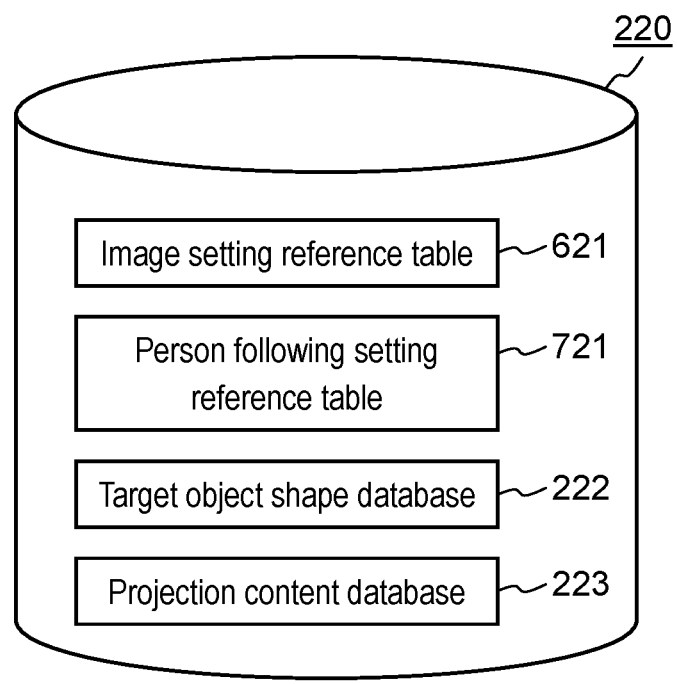
FIG. 21 is a schematic diagram for describing data stored in a memory according to a fourth exemplary embodiment.

As illustrated in FIG. 21, memory 220 of projector device 100 stores image setting reference table 621, person following setting reference table 721, target object shape database 222, and projection content database 223. Target object shape database 222 and projection content database 223 are similar to those in the first exemplary embodiment, so that the description thereof will be omitted.

FIG. 22A is a diagram illustrating the detail of image setting reference table 621. Image setting reference table 621 manages target object 621a, projection content 621b, and projection region 621c of an image in association with one another. Image setting reference table 621 manages the information pieces similar to image setting reference table 421 in the third exemplary embodiment.

FIG. 22B is a diagram illustrating the detail of person following setting reference table 721. Person following setting reference table 721 is a table for switching a person following setting for a target object based on whether a region on which target object 721a is present is included in a later-described region with no difference or in a later-described region with difference.

The detail will be described below. Briefly, flag 721ba in person following setting 721b is set to be ON for a target object included in the later-described region with no difference based on person following setting reference table 721. (Both position flag 721bb and direction flag 721bc are set to be "YES".) Person following setting 721b is set to be OFF for a target object included in the later-described region with difference.

Projector device 100 according to the fourth exemplary embodiment determines whether a target object is included in the region with no difference or in the region with difference, and controls a projection position and/or direction of a projection content by switching the person following setting according to the determination result based on image setting reference table 621 and person following setting reference table 721.

[4-3. Operation]

Next, an operation of projector device 100 will be described with reference to FIGS. 23 to 27.

Figure 23:
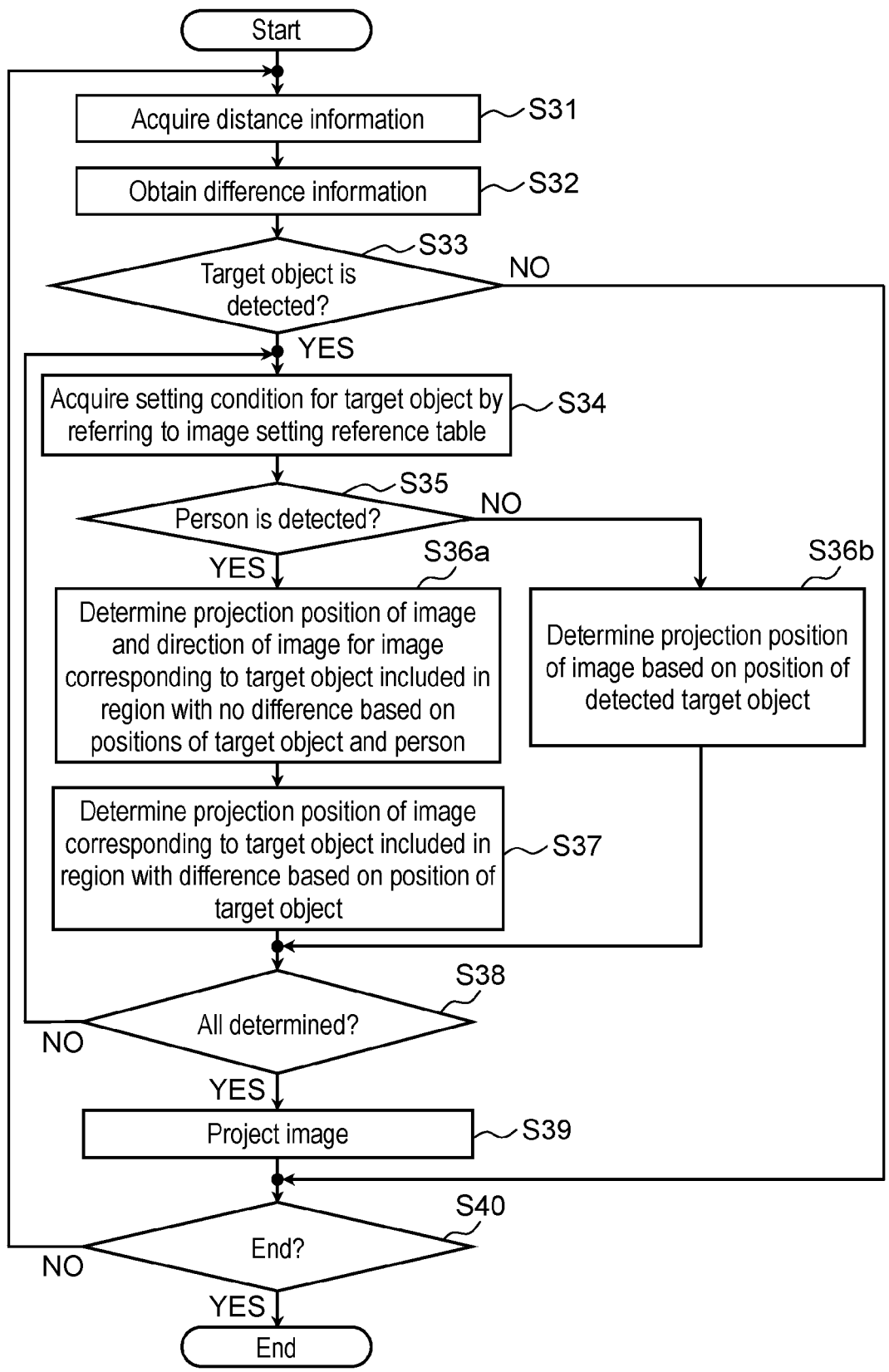
FIG. 23 is a flowchart illustrating an image projection operation according to the fourth exemplary embodiment.

FIG. 23 is a flowchart illustrating an operation flow of projector device 100.

Figure 24:
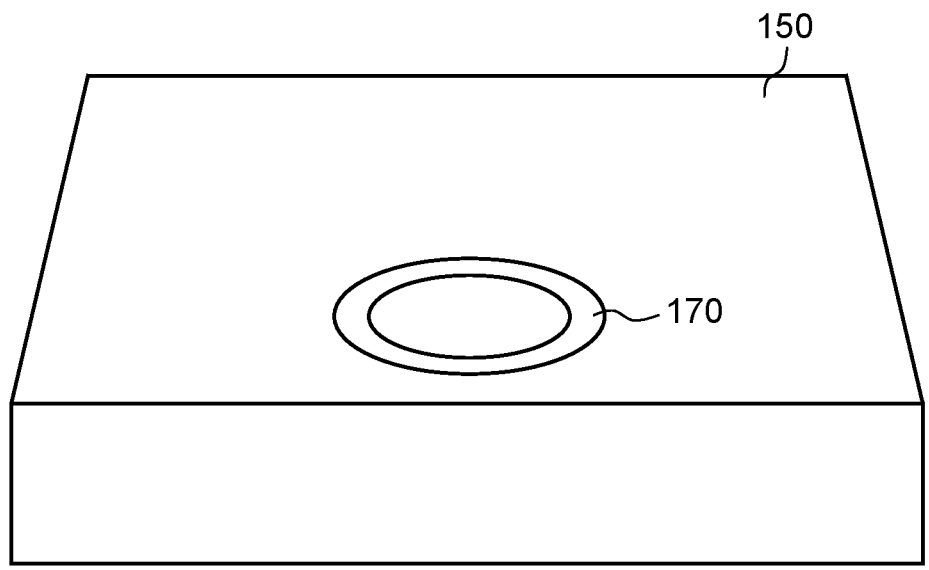
FIG. 24 is a schematic diagram illustrating an example of a distance image (reference image) used as a reference.

Controller 210 in projector device 100 firstly acquires distance information (initial distance image) which becomes an initial value. FIG. 24 is a schematic diagram illustrating an example of the distance information acquired as the initial distance image. FIG. 24 is distance information indicating a state in which dish 170 is placed on table 150.

Figure 25:
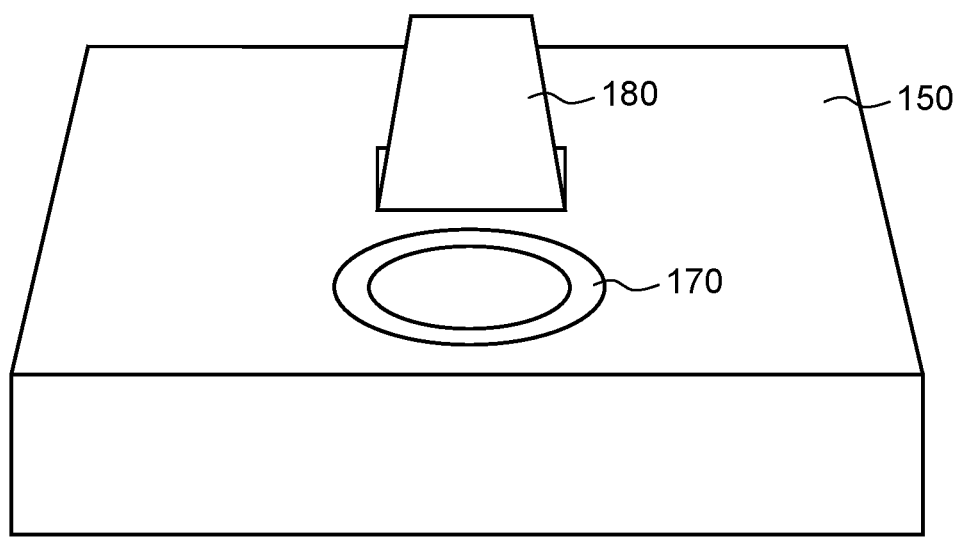
FIG. 25 is a schematic diagram illustrating an example of a distance image.

It is supposed here that, after the initial distance image is acquired, information board 180 is further placed on table 150 as illustrated in FIG. 25. Controller 210 acquires distance information from sensor unit 230 (step S31). FIG. 25 is a schematic diagram illustrating an example of the distance information acquired after information board 180 is placed. In the state illustrated in FIG. 25, dish 170 and information board 180 are placed on table 150.

Controller 210 calculates a difference image (difference information) which is the difference between the distance information (distance image) acquired in step S31 and the initial distance image (step S32).

Figure 26:
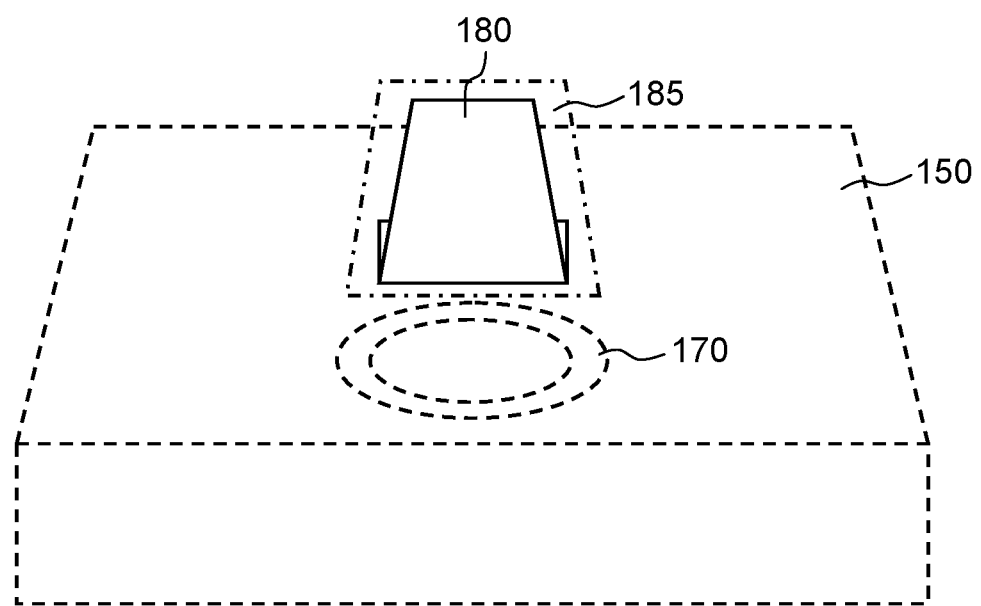
FIG. 26 is a schematic diagram describing a region with difference.

FIG. 26 is a schematic diagram illustrating an example of the difference image. Controller 210 obtains a region (region with difference) different from the initial distance information and a region (region with no difference) which is the same as the initial distance information based on the difference image. In FIG. 26, the region of information board 180 is recognized as region with difference 185, and the remaining region is recognized as the region with no difference.

Controller 210 detects a target object based on the distance information acquired in step S31. Specifically, controller 210 performs a matching process to distance information (distance image) based on target object shape database 222 stored in memory 220, thereby detecting a target object from distance information.

Controller 210 determines whether a target object is detected or not (step S33). When a target object is detected (YES in step S33), the process proceeds to step S34. When a target object is not detected (NO in step S33), the process proceeds to step S40. In the state illustrated in FIG. 25, controller 210 detects table 150 as "table A", dish 170 as "dish B", and information board 180 as "information board C". Then, the process proceeds to step S34.

Controller 210 acquires a setting condition by referring to image setting reference table 621 and person following setting reference table 721 (FIG. 22A and FIG. 22B) for table 150, dish 170, and information board 180 which are the detected target objects (step S34).

Controller 210 determines whether a person is detected or not (step S35). When a person is detected (YES in step S35), the process proceeds to step S36a, and when a person is not detected (NO in step S35), the process proceeds to step S36b.

When a person is detected, controller 210 determines the projection position and direction of the projection content for the target objects (table 150 and dish 170) included in the region with no difference (step S36a).

The setting condition (image setting reference table 621 and person following setting reference table 721) in FIG. 22 specifies that content A should be projected on "table A" as for "table A", and that as for the target object included in the region with no difference, the projection position and direction of the projection content are variably determined by following the position of the person. As for information board C, the setting condition specifies that content C should be projected on information board C, and that as for the target object included in the region with difference, the setting condition specifies that the projection position and direction of the projection content is determined without depending on the position of the person.

Therefore, controller 210 determines the projection position and direction of content A (image of a user interface for menu operation) that should be projected on table 150 which is "table A" within the projection region (on table 150) based on the position of the detected person (step S36a). More specifically, controller 210 obtains a region away from the person by a predetermined distance, out of regions on table 150, and determines a projection direction such that the vertical direction or horizontal direction of the projected image becomes right for the detected person.

Controller 210 determines the projection position and the like of content C (image of food information) that should be projected on information board C (information board 180), without depending on whether a person is detected or not (without depending on a position of a person even if a person is detected) (step S37). More specifically, controller 210 determines the projection position to be a predetermined position (e.g., center) in the region on information board 180, and determines the projection direction in a predetermined direction.

After the projection position and the like of the projection content corresponding to the detected target objects are all determined, the process proceeds to step S39.

Controller 210 generates image data of a projection image including the projection contents based on the determined position and the like. Then, controller 210 controls light source unit 300, image generation unit 400, and projection optical system 500 to project the projection image (step S39). In this case, controller 210 may perform a process such as a geometric correction to the image data stored in projection content database 223 in order that the image is displayed with a right shape when it is projected.

Figure 27:
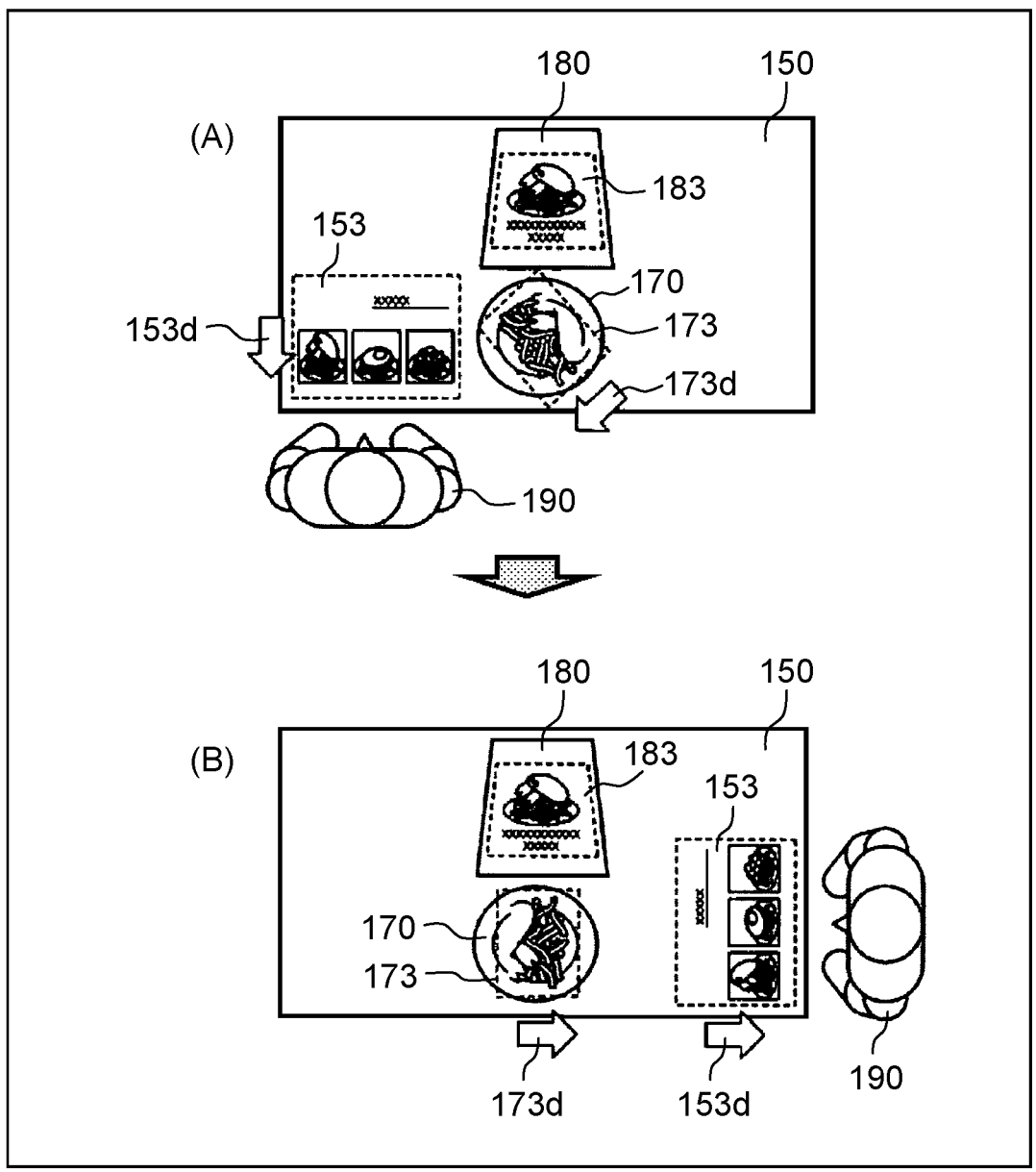
FIG. 27 is a schematic diagram illustrating a state in which a position and/or direction of a projection content is changed according to a movement of a person.

FIG. 27 is a schematic diagram illustrating the state in which projection contents 153, 173 and 183 are projected.

As illustrated in FIGS. 27(A) and (B), projection content 153 is a projection content corresponding to table 150 included in the region with no difference. Therefore, projection content 153 is projected in a region having a predetermined positional relation with person 190 in a region on table 150 such that the vertical direction of the projected image becomes the right direction (arrow 153d) for person 190. Specifically, when person 190 moves, projector device 100 projects projection content 153, while changing the projection position and direction according to the position of person 190 as illustrated in FIG. 27(B). Projection content 173 is also a projection content corresponding to dish B included in the region with no difference. Therefore, projection content 173 is projected in a region on dish 170 such that the vertical direction of the projected image becomes the right direction (arrow 173d) for person 190. On the other hand, projection content 183 is a projection content corresponding to information board C included in the region with difference. Therefore, projection content 183 is projected at a predetermined position (e.g., the center of information board 180) within a region of information board 180 with the projection direction determined in a predetermined direction. Specifically, projector device 100 projects projection content 183 on the predetermined position without depending on the position of person 190.

As described above, when a person is detected (YES in step S35), controller 210 variably controls the projection position and/or direction of the projection content corresponding to the target object according to a position of a detected person, in the case where the target object is included in the region with no difference. At the same time, controller 210 controls the projection position and/or direction of the projection content corresponding to the target object included in the region with difference without depending on the position of the detected person.

When a person is not detected (NO in step S35), controller 210 may control such that the projection position and direction of the projection content corresponding to the target object becomes predetermined position and direction without depending on whether the target object is included in the region with difference or in the region with no difference.

[4-4. Effect, Etc.]

When there are a projection content whose projection position and the like are desirably changed according to a position of a moving object (e.g., person) and a projection content which is desirably projected on a predetermined object on which the projection content is to be projected without depending on a position of a moving object (e.g., person), projector device 100 according to the fourth exemplary embodiment can project the former projection content by changing the image (the projection position and/or direction) according to the position of the person, and at the same time, projector device 100 can project the latter projection content without depending on the position of the person.

Other Exemplary Embodiments

The first to fourth exemplary embodiments have been described above as illustrative examples of the technique in the present disclosure. However, the technique in the present disclosure is not limited to these, and can be applied to exemplary embodiments in which various changes, replacements, additions, omissions, etc., are made. Furthermore, a new exemplary embodiment can be formed by combining each component described in the first to fourth exemplary embodiments.

The first to fourth exemplary embodiments describe that controller 210 is a semiconductor element. For example, controller 210 may include a CPU (Central Processing Unit) and its auxiliary circuit. Controller 210 performs the above operation by executing various processes according to the program and data stored in memory 220. It is to be noted that controller 210 can be mounted as a programmable logic device such as an ASIC (Application Specific Integrated Circuit) or FPGA (Field-Programmable Gate Array) or a processor such as a microcontroller.

The first to fourth exemplary embodiments describe that sensor unit 230 is a TOF sensor. However, sensor unit 230 should not be limited to a TOF sensor. Sensor unit 230 may be a device (e.g., RGB camera) that can output a signal necessary for detecting an object.

The exemplary embodiments have been described above as illustrative examples of the technique in the present disclosure. The accompanying drawings and the detailed description are provided for this purpose.

Thus, elements appearing in the accompanying drawings and the detailed description include not only those that are essential for solving the problems, but also those that are not essential for solving the problems but are merely used to illustrate the technique disclosed herein. Therefore, those non-essential elements should not immediately be taken as being essential for the reason that they appear in the accompanying drawings and/or in the detailed description.

The exemplary embodiments above are for illustrating the technique disclosed herein, and various changes, replacements, additions, omissions, etc., can be made without departing from the scope defined by the claims and equivalents thereto.

The present disclosure is useful as a projection device which can appropriately control a position where an image content is to be projected, and the like.

What is claimed is:

1. A projection device comprising:
a sensor unit that detects an object;
a detection unit configured to detect a moving object, a first object, and a second object based on a signal output from the sensor unit;
a controller configured to generate a projection image such that a first image corresponding to the first object is projected on a first projection region and a second image corresponding to the second object is projected on a second projection region; and
a projection unit projecting the projection image,
wherein the controller determines the first image based on a position of the moving object, and determines the second image without depending on a position of the moving object.

2. The projection device according to claim 1, wherein the controller determines at least one of the first projection region and a direction of the first image based on a position of the moving object.

3. The projection device according to claim 1, wherein the detection unit detects a person as the moving object.

4. The projection device according to claim 1, wherein the sensor unit is a distance image sensor of a Time-of-Flight system.

5. The projection device according to claim 1, wherein the sensor unit is a camera.

6. A projection method for projecting an image, the method comprising:
detecting an object by a sensor unit;
detecting a moving object, a first object, and a second object by a detection unit based on a signal output from the sensor unit;
generating a projection image by a controller such that a first image corresponding to the first object is projected on a first projection region and a second image corresponding to the second object is projected on a second projection region; and
projecting the projection image by a projection unit,
wherein the controller determines the first image based on a position of the moving object, and determines the second image without depending on a position of the moving object, in the step of generating the projection image.

7. The projection method according to claim 6, wherein the controller determines at least one of the first projection region and a direction of the first image based on a position of the moving object in the step of generating the projection image.

* * * * *